United States Patent
Ashworth

(10) Patent No.: US 10,432,294 B2
(45) Date of Patent: Oct. 1, 2019

(54) SIGNAL BOOSTER WITH SPECTRALLY ADJACENT BANDS

(71) Applicant: WILSON ELECTRONICS, LLC, St. George, UT (US)

(72) Inventor: Christopher Ken Ashworth, St. George, UT (US)

(73) Assignee: WILSON ELECTRONICS, LLC, St. George, UT (US)

( * ) Notice: Subject to any disclaimer, the term of this patent is extended or adjusted under 35 U.S.C. 154(b) by 0 days.

(21) Appl. No.: 15/887,905

(22) Filed: Feb. 2, 2018

(65) Prior Publication Data
US 2018/0219609 A1  Aug. 2, 2018

Related U.S. Application Data

(60) Provisional application No. 62/487,936, filed on Apr. 20, 2017, provisional application No. 62/453,897, filed on Feb. 2, 2017.

(51) Int. Cl.
*H04B 7/155* (2006.01)
*H04B 1/00* (2006.01)
*H04W 16/26* (2009.01)

(52) U.S. Cl.
CPC ....... *H04B 7/15507* (2013.01); *H04B 1/0053* (2013.01); *H04B 1/0057* (2013.01);
(Continued)

(58) Field of Classification Search
CPC .............. H04B 1/0053; H04B 1/0057; H04B 7/15507; H04B 7/15535; H04B 7/15542; H04W 16/26
See application file for complete search history.

(56) References Cited

U.S. PATENT DOCUMENTS 4,776,032 A  10/1988 Odate
5,303,395 A  4/1994 Dayani
(Continued)

FOREIGN PATENT DOCUMENTS

EP  1525678  7/2008
WO  WO 2009/046228 A1  4/2009

OTHER PUBLICATIONS

PCT Application No. PCT/US2018/016739 Filing date Feb. 2, 2018, Christopher Ken Ashworth, International Search Report, dated May 14, 2018, 17 Pages.
(Continued)

*Primary Examiner* — Dominic E Rego
(74) *Attorney, Agent, or Firm* — Thorpe North & Western

(57) ABSTRACT

Technology for a repeater is disclosed. The repeater can include a first multiband filter. The repeater can include a second multiband filter. The repeater can include one or more first-direction signal paths communicatively coupled between the first multiband filter and the second multi-band filter. At least one of the one or more first-direction signal paths can be configured to amplify and filter signals in two or more spectrally adjacent bands. The repeater can include one or more second-direction signal paths communicatively coupled between the first multiband filter and the second multi-band filter. At least one of the one or more second-direction signal paths can be configured to amplify and filter signals in two or more spectrally adjacent bands.

24 Claims, 16 Drawing Sheets

(52) U.S. Cl.
CPC ..... *H04B 7/15535* (2013.01); *H04B 7/15542* (2013.01); *H04W 16/26* (2013.01)

(56) References Cited

U.S. PATENT DOCUMENTS

| | | | |
|---|---|---|---|
| 5,737,687 | A | 4/1998 | Martin |
| 5,777,530 | A | 7/1998 | Nakatuka |
| 5,835,848 | A | 11/1998 | Bi |
| 6,005,884 | A | 12/1999 | Cook |
| 6,711,388 | B1 | 3/2004 | Jukka-Pekka |
| 6,889,033 | B2 | 5/2005 | Bongfeldt |
| 6,990,313 | B1 | 1/2006 | Yarkosky |
| 7,035,587 | B1 | 4/2006 | Yarkosky |
| 7,187,913 | B1 * | 3/2007 | Rahn ................. H03J 1/005 348/731 |
| 7,221,967 | B2 | 5/2007 | Van Buren |
| 7,974,573 | B2 | 7/2011 | Dean |
| 8,755,399 | B1 | 6/2014 | Buren et al. |
| 8,867,572 | B1 | 10/2014 | Zhan |
| 9,402,190 | B2 | 7/2016 | Zhan |
| 2002/0044594 | A1 | 4/2002 | Bongfeldt |
| 2003/0123401 | A1 | 7/2003 | Dean |
| 2003/0232595 | A1 | 12/2003 | Baker et al. |
| 2004/0137854 | A1 | 6/2004 | Ge |
| 2004/0146013 | A1 | 7/2004 | Song |
| 2004/0166802 | A1 | 8/2004 | McKay |
| 2004/0219876 | A1 | 11/2004 | Baker |
| 2004/0235417 | A1 | 11/2004 | Dean |
| 2005/0118949 | A1 | 6/2005 | Allen |
| 2006/0084379 | A1 | 4/2006 | O'Neill |
| 2007/0071128 | A1 | 4/2007 | Meir |
| 2007/0188235 | A1 | 8/2007 | Dean |
| 2008/0081555 | A1 | 4/2008 | Kong |
| 2008/0096483 | A1 | 4/2008 | Van Buren, II |
| 2008/0278237 | A1 | 11/2008 | Blin |
| 2009/0011736 | A1 | 1/2009 | Malasani |
| 2010/0321110 | A1 | 12/2010 | Ichitsubo et al. |
| 2011/0151775 | A1 | 6/2011 | Kang |
| 2013/0077502 | A1 | 3/2013 | Gainey et al. |
| 2015/0256207 | A1 * | 9/2015 | Liao ................... H04B 1/0007 375/349 |
| 2016/0044677 | A1 * | 2/2016 | King ..................... H04B 1/40 455/450 |
| 2016/0135059 | A1 | 5/2016 | Zhan |
| 2016/0198347 | A1 | 7/2016 | Zhan |
| 2016/0233895 | A1 * | 8/2016 | Khlat .................. H04B 1/0064 |
| 2017/0163229 | A1 * | 6/2017 | Oyama .................. H03F 1/56 |
| 2017/0237497 | A1 | 8/2017 | Yogeeswaran et al. |
| 2017/0302251 | A1 * | 10/2017 | Ruby ................ H03H 9/02055 |
| 2017/0332280 | A1 * | 11/2017 | Kuroda ................ H04W 28/16 |
| 2018/0042009 | A1 * | 2/2018 | Abdel Shahid ..... H04W 72/121 |

OTHER PUBLICATIONS

PCT Application No. PCT/US2018/016740 Filing date Feb. 2, 2018, Christopher Ken Ashworth, International Search Report, dated May 14, 2018, 14 Pages.

3GPP2 C.S0011-B; "Recommended Minimum Performance Standards for cdma2000® Spread Spectrum Mobile Stations"; TIA-98-E; (Dec. 13, 2002); 448 pages; Release B, V1.0, Revision E.

ADL5513; "1 MHz to 4 GHz, 80 dB Logarithmic Detector/Controller"; Data Sheet; (2008); 12 pages; Analog Devices, Inc.

HMC713LP3E; "54 dB, Logarithmic Detector / Controller, 50—8000 MHz"; Data Sheet; (2010); 12 pages.

HMC909LP4E; "RMS Power Detector Single-Ended, DC—5.8 GHz"; Data Sheet; (2010); 21 pages.

PIC16F873; "28/40-Pin 8-Bit CMOS Flash Microcontrollers"; (2001); Data Sheet; 218 pages.

* cited by examiner

SIGNAL BOOSTER WITH SPECTRALLY ADJACENT BANDS

RELATED APPLICATIONS

The present application claims the benefit of U.S. Provisional Patent Application No. 62/453,897, filed Feb. 2, 2017 and the benefit of U.S. Provisional Patent Application No. 62/487,936, filed Apr. 20, 2017, the entire specifications of which are hereby incorporated by reference in their entirety for all purposes.

BACKGROUND

Signal boosters and repeaters can be used to increase the quality of wireless communication between a wireless device and a wireless communication access point, such as a cell tower. Signal boosters can improve the quality of the wireless communication by amplifying, filtering, and/or applying other processing techniques to uplink and downlink signals communicated between the wireless device and the wireless communication access point.

As an example, the signal booster can receive, via an antenna, downlink signals from the wireless communication access point. The signal booster can amplify the downlink signal and then provide an amplified downlink signal to the wireless device. In other words, the signal booster can act as a relay between the wireless device and the wireless communication access point. As a result, the wireless device can receive a stronger signal from the wireless communication access point. Similarly, uplink signals from the wireless device (e.g., telephone calls and other data) can be directed to the signal booster. The signal booster can amplify the uplink signals before communicating, via an antenna, the uplink signals to the wireless communication access point.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein.

Figure 1:
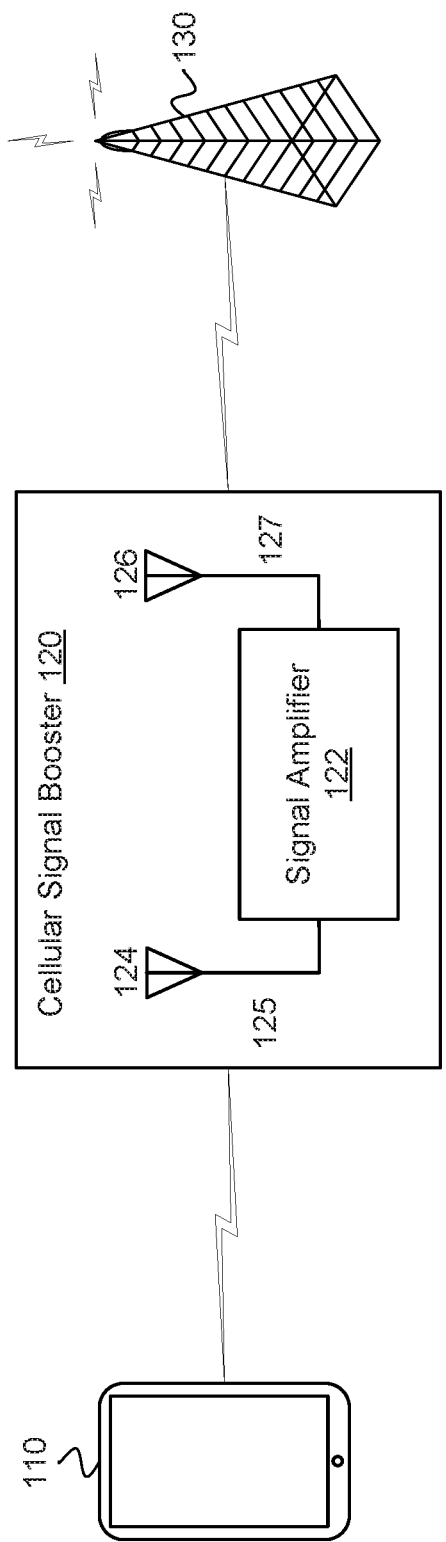
FIG. 1 illustrates a signal booster in communication with a wireless device and a base station in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

EXAMPLE EMBODIMENTS

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

FIG. 1 illustrates an exemplary signal booster 120 in communication with a wireless device 110 and a base station 130. The signal booster 120 can be referred to as a repeater. A repeater can be an electronic device used to amplify (or boost) signals. The signal booster 120 (also referred to as a cellular signal amplifier) can improve the quality of wireless communication by amplifying, filtering, and/or applying other processing techniques via a signal amplifier 122 to uplink signals communicated from the wireless device 110 to the base station 130 and/or downlink signals communicated from the base station 130 to the wireless device 110. In other words, the signal booster 120 can amplify or boost uplink signals and/or downlink signals bi-directionally. In one example, the signal booster 120 can be at a fixed location, such as in a home or office. Alternatively, the signal booster 120 can be attached to a mobile object, such as a vehicle or a wireless device 110.

In one configuration, the signal booster 120 can include an integrated device antenna 124 (e.g., an inside antenna or a coupling antenna) and an integrated node antenna 126 (e.g., an outside antenna). The integrated node antenna 126 can receive the downlink signal from the base station 130. The downlink signal can be provided to the signal amplifier 122 via a second coaxial cable 127 or other type of radio frequency connection operable to communicate radio frequency signals.

The signal amplifier 122 can include one or more cellular signal amplifiers for amplification and filtering. The downlink signal that has been amplified and filtered can be provided to the integrated device antenna 124 via a first coaxial cable 125 or other type of radio frequency connection operable to communicate radio frequency signals. The integrated device antenna 124 can wirelessly communicate the downlink signal that has been amplified and filtered to the wireless device 110.

Similarly, the integrated device antenna 124 can receive an uplink signal from the wireless device 110. The uplink signal can be provided to the signal amplifier 122 via the first coaxial cable 125 or other type of radio frequency connection operable to communicate radio frequency signals. The signal amplifier 122 can include one or more cellular signal amplifiers for amplification and filtering. The uplink signal that has been amplified and filtered can be provided to the integrated node antenna 126 via the second coaxial cable 127 or other type of radio frequency connection operable to communicate radio frequency signals. The integrated device antenna 126 can communicate the uplink signal that has been amplified and filtered to the base station 130.

In one example, the signal booster 120 can filter the uplink and downlink signals using any suitable analog or digital filtering technology including, but not limited to, surface acoustic wave (SAW) filters, bulk acoustic wave (BAW) filters, film bulk acoustic resonator (FBAR) filters, ceramic filters, waveguide filters or low-temperature co-fired ceramic (LTCC) filters.

In one example, the signal booster 120 can send uplink signals to a node and/or receive downlink signals from the node. The node can comprise a wireless wide area network (WWAN) access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or another type of WWAN access point.

In one configuration, the signal booster 120 used to amplify the uplink and/or a downlink signal is a handheld booster. The handheld booster can be implemented in a sleeve of the wireless device 110. The wireless device sleeve can be attached to the wireless device 110, but can be removed as needed. In this configuration, the signal booster 120 can automatically power down or cease amplification when the wireless device 110 approaches a particular base station. In other words, the signal booster 120 can determine to stop performing signal amplification when the quality of uplink and/or downlink signals is above a defined threshold based on a location of the wireless device 110 in relation to the base station 130.

In one example, the signal booster 120 can include a battery to provide power to various components, such as the signal amplifier 122, the integrated device antenna 124 and the integrated node antenna 126. The battery can also power the wireless device 110 (e.g., phone or tablet). Alternatively, the signal booster 120 can receive power from the wireless device 110.

In one configuration, the signal booster 120 can be a Federal Communications Commission (FCC)-compatible consumer signal booster. As a non-limiting example, the signal booster 120 can be compatible with FCC Part 20 or 47 Code of Federal Regulations (C.F.R.) Part 20.21 (Mar. 21, 2013). In addition, the signal booster 120 can operate on the frequencies used for the provision of subscriber-based services under parts 22 (Cellular), 24 (Broadband PCS), 27 (AWS-1, 700 MHz Lower A-E Blocks, and 700 MHz Upper C Block), and 90 (Specialized Mobile Radio) of 47 C.F.R. The signal booster 120 can be configured to automatically self-monitor its operation to ensure compliance with applicable noise and gain limits. The signal booster 120 can either self-correct or shut down automatically if the signal booster's operations violate the regulations defined in FCC Part 20.21.

In one configuration, the signal booster 120 can improve the wireless connection between the wireless device 110 and the base station 130 (e.g., cell tower) or another type of wireless wide area network (WWAN) access point (AP).

The signal booster 120 can boost signals for cellular standards, such as the Third Generation Partnership Project (3GPP) Long Term Evolution (LTE) Release 8, 9, 10, 11, 12, or 13 standards or Institute of Electronics and Electrical Engineers (IEEE) 802.16. In one configuration, the signal booster 120 can boost signals for 3GPP LTE Release 13.0.0 (March 2016) or other desired releases. The signal booster 120 can boost signals from the 3GPP Technical Specification 36.101 (Release 12 Jun. 2015) bands or LTE frequency bands. For example, the signal booster 120 can boost signals from the LTE frequency bands: 2, 4, 5, 12, 13, 17, and 25. In addition, the signal booster 120 can boost selected frequency bands based on the country or region in which the signal booster is used, including any of bands 1-70 or other bands, as disclosed in ETSI TS136 104 V13.5.0 (2016-10).

The number of LTE frequency bands and the level of signal improvement can vary based on a particular wireless device, cellular node, or location. Additional domestic and international frequencies can also be included to offer increased functionality. Selected models of the signal booster 120 can be configured to operate with selected frequency bands based on the location of use. In another example, the signal booster 120 can automatically sense from the wireless device 110 or base station 130 (or GPS, etc.) which frequencies are used, which can be a benefit for international travelers.

In one example, the integrated device antenna 124 and the integrated node antenna 126 can be comprised of a single antenna, an antenna array, or have a telescoping form-factor. In another example, the integrated device antenna 124 and the integrated node antenna 126 can be a microchip antenna. An example of a microchip antenna is AMMAL001. In yet another example, the integrated device antenna 124 and the integrated node antenna 126 can be a printed circuit board (PCB) antenna. An example of a PCB antenna is TE 2118310-1.

In one example, the integrated device antenna 124 can receive uplink (UL) signals from the wireless device 110 and transmit DL signals to the wireless device 110 using a single antenna. Alternatively, the integrated device antenna 124 can receive UL signals from the wireless device 110 using a dedicated UL antenna, and the integrated device antenna 124 can transmit DL signals to the wireless device 110 using a dedicated DL antenna.

In one example, the integrated device antenna 124 can communicate with the wireless device 110 using near field communication. Alternatively, the integrated device antenna 124 can communicate with the wireless device 110 using far field communication.

In one example, the integrated node antenna 126 can receive downlink (DL) signals from the base station 130 and transmit uplink (UL) signals to the base station 130 via a single antenna. Alternatively, the integrated node antenna 126 can receive DL signals from the base station 130 using a dedicated DL antenna, and the integrated node antenna 126 can transmit UL signals to the base station 130 using a dedicated UL antenna.

In one configuration, multiple signal boosters can be used to amplify UL and DL signals. For example, a first signal booster can be used to amplify UL signals and a second signal booster can be used to amplify DL signals. In addition, different signal boosters can be used to amplify different frequency ranges.

In one configuration, the signal booster 120 can be configured to identify when the wireless device 110 receives a relatively strong downlink signal. An example of a strong downlink signal can be a downlink signal with a signal strength greater than approximately −80 dBm. The signal booster 120 can be configured to automatically turn off selected features, such as amplification, to conserve battery life. When the signal booster 120 senses that the wireless device 110 is receiving a relatively weak downlink signal, the integrated booster can be configured to provide amplification of the downlink signal. An example of a weak downlink signal can be a downlink signal with a signal strength less than −80 dBm.

In one example, the signal booster 120 can also include one or more of: a waterproof casing, a shock absorbent casing, a flip-cover, a wallet, or extra memory storage for the wireless device. In one example, extra memory storage can be achieved with a direct connection between the signal booster 120 and the wireless device 110. In another example, Near-Field Communications (NFC), Bluetooth v4.0, Bluetooth Low Energy, Bluetooth v4.1, Bluetooth v4.2, Bluetooth 5, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, or IEEE 802.11ad can be used to couple the signal booster 120 with the wireless device 110 to enable data from the wireless device 110 to be communicated to and stored in the extra memory storage that is integrated in the signal booster 120. Alternatively, a connector can be used to connect the wireless device 110 to the extra memory storage.

In one example, the signal booster 120 can include photovoltaic cells or solar panels as a technique of charging the integrated battery and/or a battery of the wireless device 110. In another example, the signal booster 120 can be configured to communicate directly with other wireless devices with signal boosters. In one example, the integrated node antenna 126 can communicate over Very High Frequency (VHF) communications directly with integrated node antennas of other signal boosters. The signal booster 120 can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band. Examples of such ISM bands include 2.4 GHz, 3.6 GHz, 4.9 GHz, 5 GHz, or 5.9 GHz. This configuration can allow data to pass at high rates between multiple wireless devices with signal boosters. This configuration can also allow users to send text messages, initiate phone calls, and engage in video communications between wireless devices with signal boosters. In one example, the integrated node antenna 126 can be configured to couple to the wireless device 110. In other words, communications between the integrated node antenna 126 and the wireless device 110 can bypass the integrated booster.

In another example, a separate VHF node antenna can be configured to communicate over VHF communications directly with separate VHF node antennas of other signal boosters. This configuration can allow the integrated node antenna 126 to be used for simultaneous cellular communications. The separate VHF node antenna can be configured to communicate with the wireless device 110 through a direct connection, Near-Field Communications (NFC), Bluetooth v4.0, Bluetooth Low Energy, Bluetooth v4.1, Bluetooth v4.2, Ultra High Frequency (UHF), 3GPP LTE, Institute of Electronics and Electrical Engineers (IEEE) 802.11a, IEEE 802.11b, IEEE 802.11g, IEEE 802.11n, IEEE 802.11ac, IEEE 802.11ad, a TV White Space Band (TVWS), or any other industrial, scientific and medical (ISM) radio band.

In one configuration, the signal booster 120 can be configured for satellite communication. In one example, the integrated node antenna 126 can be configured to act as a satellite communication antenna. In another example, a separate node antenna can be used for satellite communications. The signal booster 120 can extend the range of coverage of the wireless device 110 configured for satellite communication. The integrated node antenna 126 can receive downlink signals from satellite communications for the wireless device 110. The signal booster 120 can filter and amplify the downlink signals from the satellite communication. In another example, during satellite communications, the wireless device 110 can be configured to couple to the signal booster 120 via a direct connection or an ISM radio band. Examples of such ISM bands include 2.4 GHz, 3.6 GHz, 4.9 GHz, 5 GHz, or 5.9 GHz.

Figure 2:
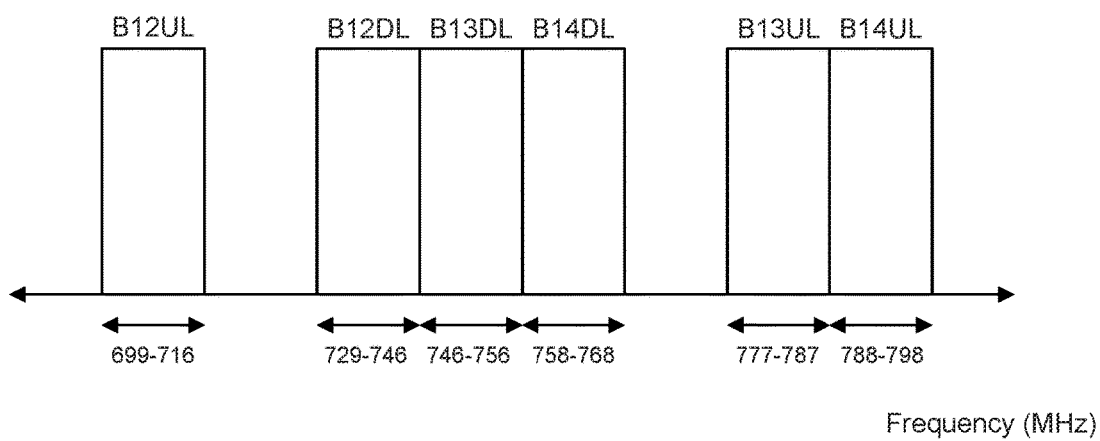
FIG. 2 illustrates frequency ranges for a plurality of uplink and downlink bands in accordance with an example.

FIG. 2 illustrates exemplary frequency ranges for a plurality of uplink and downlink bands. The frequency ranges can be measured in megahertz (MHz). The uplink bands can include band 12 (B12), band 13 (B13) and band 14 (B14). The downlink bands can include band 12 (B12), band 13 (B13) and band 14 (B14). As shown, B12 can correspond to a frequency range of 699 MHz to 716 MHz in an uplink. B12 can correspond to a frequency range of 729 MHz to 746 MHz in a downlink, B13 can correspond to a frequency range of 746 MHz to 756 MHz in the downlink, and B14 can correspond to a frequency range of 758 MHz to 768 MHz in the downlink. B12, B13 and B14 can be spectrally adjacent bands in the downlink. In addition, B13 can correspond to a frequency range of 777 MHz to 787 MHz in the uplink, and B14 can correspond to a frequency range of 788 MHz to 798 MHz in the uplink. B13 and B14 can be spectrally adjacent bands in the downlink.

Figure 3:
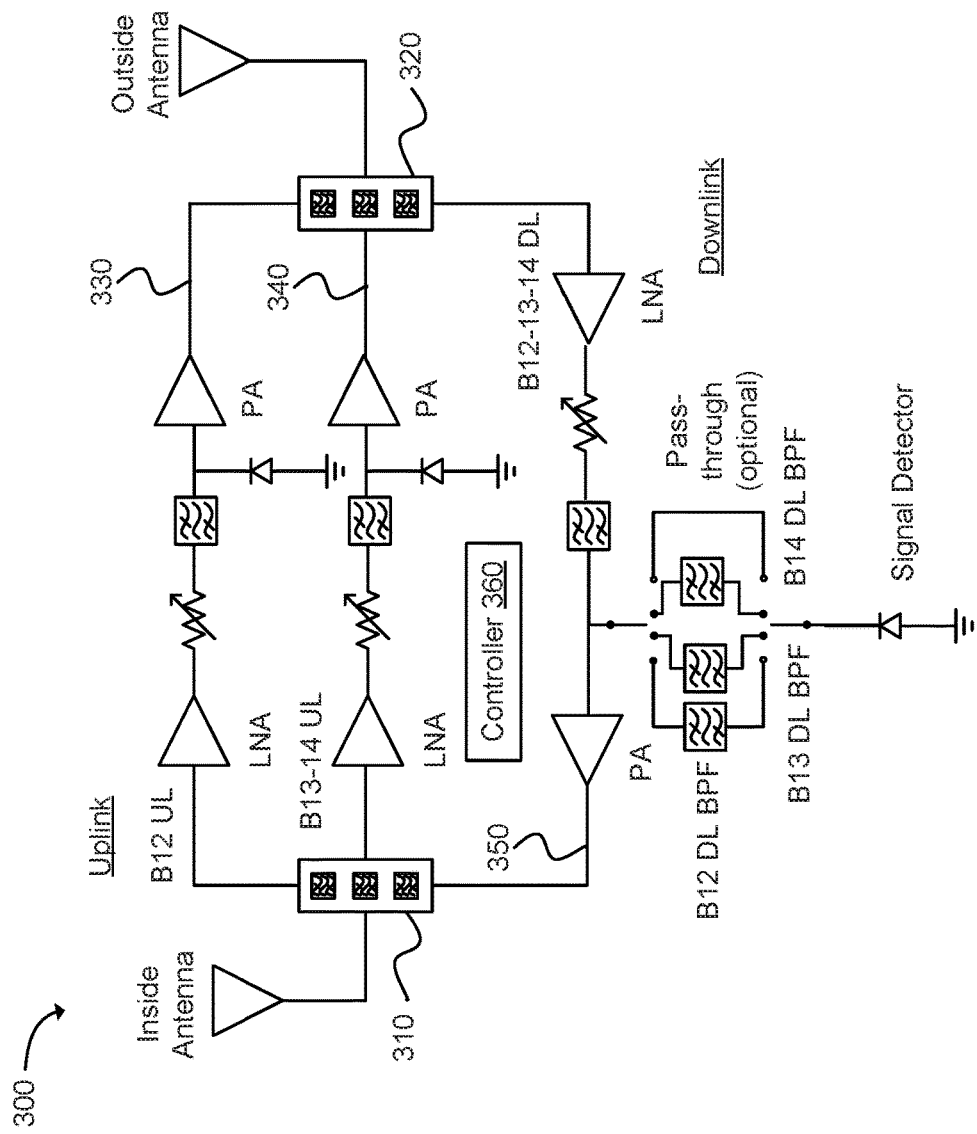
FIG. 3 illustrates a signal booster that includes uplink and/or downlink signal paths in spectrally adjacent bands in accordance with an example.

FIG. 3 illustrates an exemplary signal booster 300. The signal booster 300 can include one or more uplink signal paths for selected bands, and the signal booster 300 can include one or more downlink signal paths for selected bands. The uplink signal paths can include one or more amplifiers and band pass filters to amplify uplink signals. Similarly, the downlink signal paths can include one or more amplifiers and band pass filters to amplify downlink signals.

In the example shown in FIG. 3, the signal booster 300 can have a first uplink signal path 330 for band 12 (B12) and a second uplink signal path 340 for B13 and B14. In uplink, B12 corresponds to a frequency range of 699 megahertz (MHz) to 716 MHz, B13 corresponds to a frequency range of 777 MHz to 787 MHz, and B14 corresponds to a frequency range of 788 MHz to 798 MHz. In the uplink, B13 and B14 can be spectrally adjacent bands. In addition, in this example, the signal booster 300 can have a downlink signal path 350 for B12, B13 and B14. In other words, the downlink signal path 350 can be a combined downlink signal path for B12, B13 and B14. In downlink, B12 corresponds to a frequency range of 729 MHz to 746 MHz, B13 corresponds to a frequency range of 746 MHz to 756 MHz, and B14 corresponds to a frequency range of 758 MHz to 768 MHz. In the downlink, B12, B13 and B14 are all spectrally adjacent to each other. Even though there is a 2 MHz gap between an end of B13 DL and a start of B14 DL (e.g., 756 MHz and 758 MHz), B13 DL and B14 DL can be considered spectrally adjacent to each other since an RF filter may be unable to roll-off quickly enough to separate the two bands.

In one example, the signal booster 300 can receive uplink signals from a mobile device (not shown) via an inside antenna coupled to the signal booster 300. An uplink signal can pass through a first triplexer 310 (or first multiband filter), and then the uplink signal can be provided to the first uplink signal path 330 for B12 or the second uplink signal path 340 for B13 and B14. The first and second uplink signal paths 330, 340 can perform amplification and filtering of the uplink signal. The first and second uplink signal paths 330, 340 can each include a low noise amplifier (LNA) and a power amplifier (PA). The uplink signal can be provided to a second triplexer 320 (or second multiband filter), and then the uplink signal can be provided to a base station (not shown) via an outside antenna coupled to the signal booster 300.

In another example, the signal booster 300 can receive downlink signals from the base station via the outside antenna. A downlink signal can pass through the second triplexer 320 (or second multiband filter), and then the downlink signal can be provided to the combined downlink signal path 350 for B12, B13 and B14. The combined downlink signal path 350 can perform amplification and filtering of the downlink signal. The combined downlink signal path 350 can include a low noise amplifier (LNA) and a power amplifier (PA). The downlink signal can be provided to the first triplexer 310 (or first multiband filter), and then the downlink signal can be provided to the mobile device via the inside antenna.

In one configuration, the signal booster 300 can include a controller 360. Generally speaking, the controller 360 can be configured to perform network protection for the signal booster 300. The controller 360 can perform network protection in accordance with Part 20 of the Federal Communications Commission (FCC) Consumer Booster Rules. The FCC Consumer Booster Rules necessitate that uplink signal paths and downlink signal are to work together for network protection. Network protection can be performed in order to protect a cellular network from overload or noise floor increase. The controller 360 can perform network protection by adjusting a gain or noise power for each band in the uplink transmission paths 330, 340 based on control information from each band in the downlink transmission paths 350. The control information from each band in the downlink transmission paths 350 can include a received signal strength indication (RSSI) associated with downlink received signals. In other words, based on the RSSI of the downlink received signals traveling on the downlink transmission paths 350, the controller 360 can adjust (i.e., increase or decrease) the gain or noise power for the uplink transmission paths 330, 340. By adjusting the gain or noise floor when performing the network protection, the signal booster 300 can prevent the network (e.g., base stations) from becoming overloaded with uplink signals from the signal booster 300 that exceed a defined threshold.

In the example shown in FIG. 3, the controller 360 can separately detect control information (e.g., RSSI) for downlink received signals with respect to B12, B13 and B14. In other words, the signal booster 300 can detect control information that pertains only to downlink received signals for B12, the signal booster 300 can detect control information that pertains only to downlink received signals for B13, and the signal booster 300 can detect control information that pertains only to downlink received signals for B14. The controller 360 can adjust the uplink gain or noise floor for B12 (i.e., the first uplink signal path 330) based only on the control information for the downlink received signals on B12. The controller 360 can adjust the uplink gain or noise floor for B13 and B14 (i.e., the second uplink signal path 340) based only on the control information for the downlink received signals on B13 or B14. In other words, the uplink gain or noise power for B12 (i.e., the first uplink signal path 330) can be controlled independent of the uplink gain or noise power for B13 and B14 (i.e., the second uplink signal path 340).

More specifically, as shown in FIG. 3, the signal booster 300 can include a switchable B12 downlink band pass filter, a switchable B13 downlink bandpass filter, a switchable B14 downlink bandpass filter, and a signal detector. The signal detector can be communicatively coupled to the switchable B12 downlink band pass filter, the switchable B13 downlink band pass filter and the switchable B14 downlink band pass filter. The B12, B13 and B14 downlink bandpass filters can be switched in and out, such that downlink received signals for B12, B13 or B14 can be provided to the signal detector. The signal detector can be a log detector (e.g., a diode), and the signal detector can detect the control information (e.g., RSSI) associated with the downlink received signals for B12, B13 or B14. In other words, the switchable B12, B13 and B14 downlink band pass filters can enable the signal detector to separately detect the control information for downlink received signals for B12, B13 and B14. The signal detector can provide the control information to the controller 360. Based only on the control information for downlink received signals for B12, the controller 360 can adjust the uplink gain or noise floor for B12 (i.e., the first uplink signal path 330). Similarly, based only on the control information for downlink received signals for B13 or B14, the controller 360 can adjust the uplink gain or noise floor for B13 and B14 (i.e., the second uplink signal path 340).

In general, using the signal detector, the controller 360 can detect single downlink bands while multiple downlink bands are passing through a common downlink signal path. With respect to the specific example shown in FIG. 3, the controller 360 can perform independent detection of control information for B12, B13 and B14, even though the signal booster 300 has a combined downlink signal path for B12, B13 and B14.

In an alternative configuration, the signal booster 300 can include a first signal detector, a second signal detector and a third signal detector. The first signal detector can detect control information (e.g., RSSI) associated with a received downlink signal for B12. The second signal detector can detect control information (e.g., RSSI) associated with a received downlink signal for B13. The third signal detector can detect control information (e.g., RSSI) associated with a received downlink signal for B14. Therefore, in this configuration, separate signal detectors can be utilized to detect the control information for the multiple downlink bands.

In one configuration, the downlink signal path 350 can include a pass through signal path to the signal detector. The pass through signal path can bypass the switchable B12, B13 and B14 downlink band pass filters. The signal detector can measure a signal power level for the pass through signal path. The signal power level can be utilized to perform automatic gain control (AGC) and to maintain a linearity of a downlink signal. Alternatively, a signal power level for each of the switchable B12, B13 and B14 downlink band pass filters can be measured and added to calculate a total signal power level.

In one configuration, the first triplexer 310 can include a first common port communicatively coupled to the inside antenna. The first triplexer 310 can include a first port that is communicatively coupled to the first uplink signal path 330 for B12. The first triplexer 310 can include a second port that is communicatively coupled to the second uplink signal path 340 for B13 and B14. The first triplexer 310 can include a third port that is communicatively coupled to the combined downlink signal path 350 for B12, B13 and B14. Similarly, the second triplexer 320 can include a second common port communicatively coupled to the outside antenna. The second triplexer 320 can include a first port that is communicatively coupled to the first uplink signal path 330 for B12. The second triplexer 320 can include a second port that is communicatively coupled to the second uplink signal path 340 for B13 and B14. The second triplexer 320 can include a third port that is communicatively coupled to the combined downlink signal path 350 for B12, B13 and B14.

In one configuration, the first triplexer 310 and the second triplexer 320 can include separate filters for B12 UL, B13 UL and/or B14 UL. Similarly, the first triplexer 310 and the second triplexer 320 can include separate filters for B12 DL, B13 DL and/or B14 DL. The filters can filter UL or DL signals, respectively.

In one configuration, the signal booster 300 can include a first multiband filter and a second multiband filter. The first and second multiband filters can be single-input single-output (SISO) multiband filters or double-input single-output (DISO) multiband filters. In this configuration, the first multiband filter and the second multiband filter can replace the first triplexer 310 and the second triplexer 320, respectively. The first multiband filter can include a first uplink port and a first downlink port. The second multiband filter can include a second uplink port and a second downlink port. One or more uplink signal paths 330, 340 can be communicatively coupled between the first uplink port in the first multiband filter and the second uplink port in the second multiband filter. Similarly, one or more downlink signal paths 350 can be communicatively coupled between the first downlink port in the first multiband filter and the second downlink port in the second multiband filter. In this configuration, each of the first and second multiband filters can include a single downlink port and a single uplink port.

Figure 4:
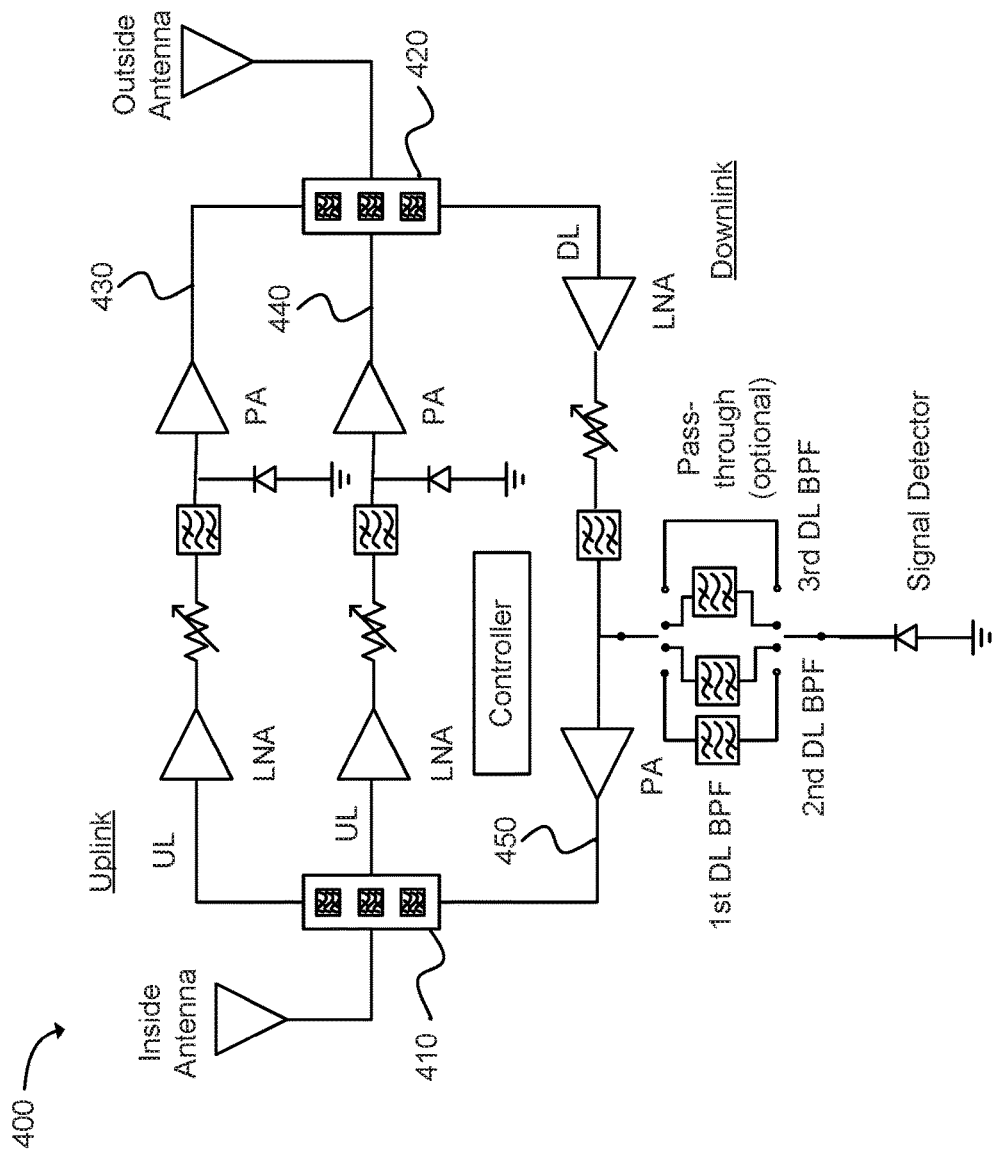
FIG. 4 illustrates a signal booster in accordance with an example.

FIG. 4 illustrates an exemplary signal booster 400. The signal booster 400 can include a first triplexer 410. The signal booster 400 can include a second triplexer 420. The signal booster 400 can include a first uplink signal path 430 communicatively coupled between the first triplexer 410 and the second triplexer 420. The first uplink signal path 430 can include one or more amplifiers and one or more band pass filters, and the first signal path 430 can be configured to amplify and filter uplink signals in a first uplink band. The signal booster 400 can include a second uplink signal path 440 communicatively coupled between the first triplexer 410 and the second triplexer 420. The second uplink signal path 440 can include one or more amplifiers and one or more band pass filters, and the second signal path 440 can be configured to amplify and filter uplink signals in one or more of a second uplink band or a third uplink band that is spectrally adjacent to the second uplink band. The signal booster 400 can include a downlink signal path 450 communicatively coupled between the first triplexer 410 and the second triplexer 420. The downlink signal path 450 can include one or more amplifiers and one or more band pass filters configured to amplify and filter downlink signals in one or more of a first downlink band, a second downlink band or a third downlink band, and the first downlink band, the second downlink band and the third downlink band can be spectrally adjacent bands. A signal detector can also be used to detect the first, second, or third downlink bands using switchable bandpass filters to pass selected bands to the signal detector. In one configuration, the downlink signal path can include a pass through signal path to the signal detector.

Figure 5:
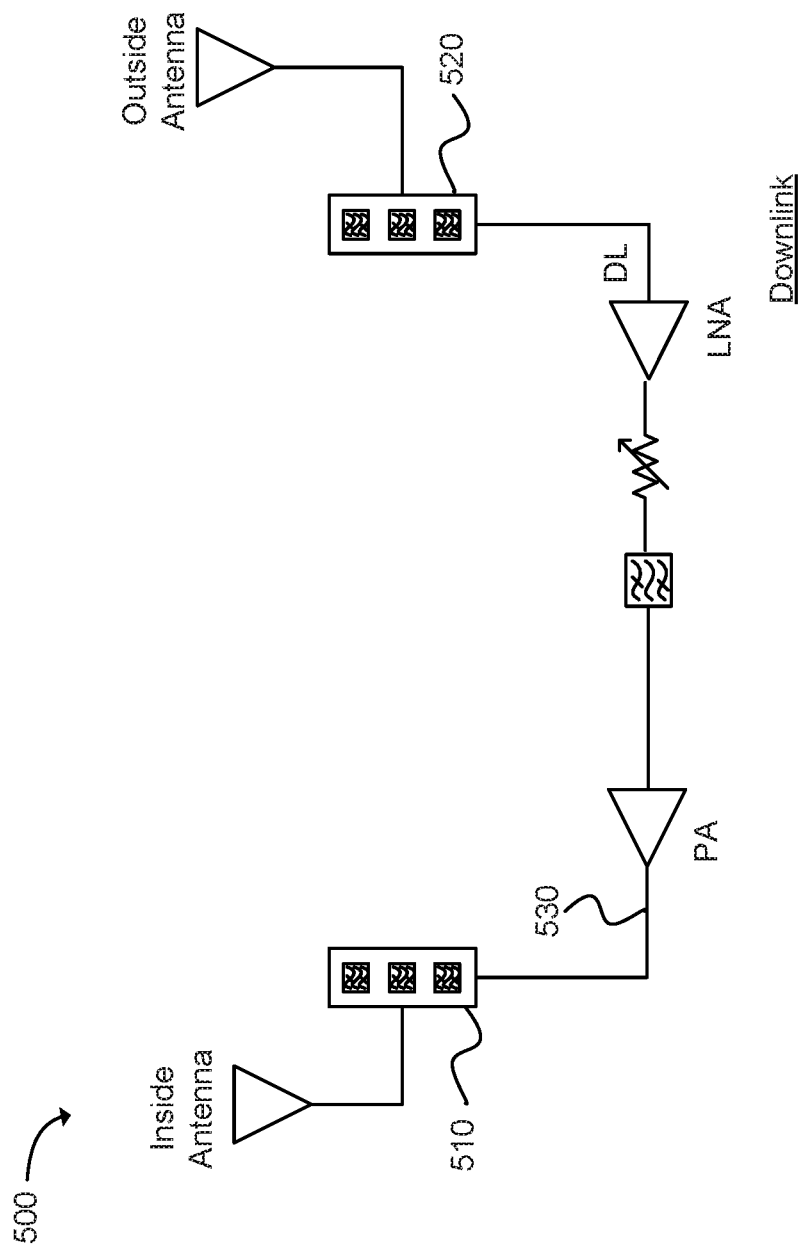
FIG. 5 illustrates a signal booster in accordance with an example.

FIG. 5 illustrates an exemplary signal booster 500. The signal booster 500 can include a first triplexer 510. The signal booster 500 can include a second triplexer 520. The signal booster 500 can include a downlink signal path 530 communicatively coupled between the first triplexer 510 and the second triplexer 520. The downlink signal path 530 can include one or more amplifiers and one or more band pass filters configured to amplify and filter downlink signals in one or more of a first downlink band, a second downlink band or a third downlink band, and the first downlink band, the second downlink band and the third downlink band can be spectrally adjacent bands.

Figure 6:
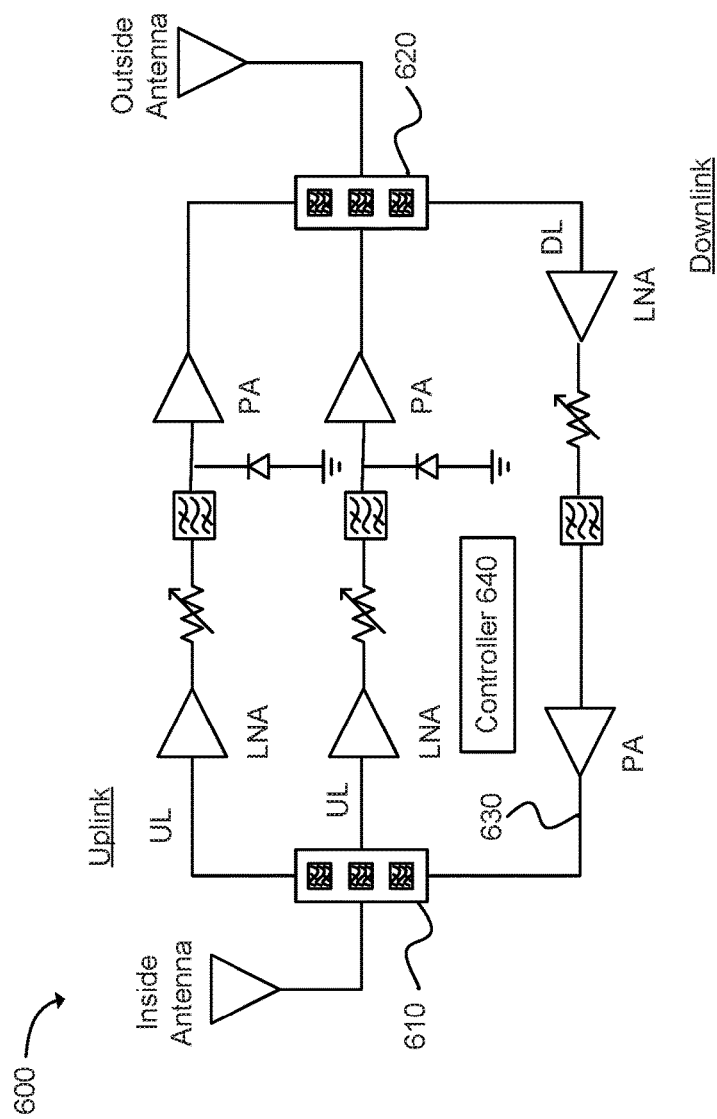
FIG. 6 illustrates a cellular signal booster in accordance with an example.

FIG. 6 illustrates an exemplary cellular signal booster 600. The cellular signal booster 600 can include a downlink cellular signal path 630 configured to amplify and filter a downlink cellular signal received in a first downlink band, a second downlink band or a third downlink band, and the first downlink band, the second downlink band and the third downlink band can be spectrally adjacent bands. The cellular signal booster 600 can include a controller 640 operable to perform network protection by adjusting an uplink gain or noise power for a first uplink band in a first uplink cellular signal path, or for a second uplink band and a third uplink band in a second uplink cellular signal path. The second uplink band can be spectrally adjacent to the third uplink band, and the uplink gain or noise power can be adjusted in the first uplink cellular path or the second uplink cellular path using control information associated with the downlink cellular signal received in one or more of the first downlink band, the second downlink band or the third downlink band.

Figure 7:
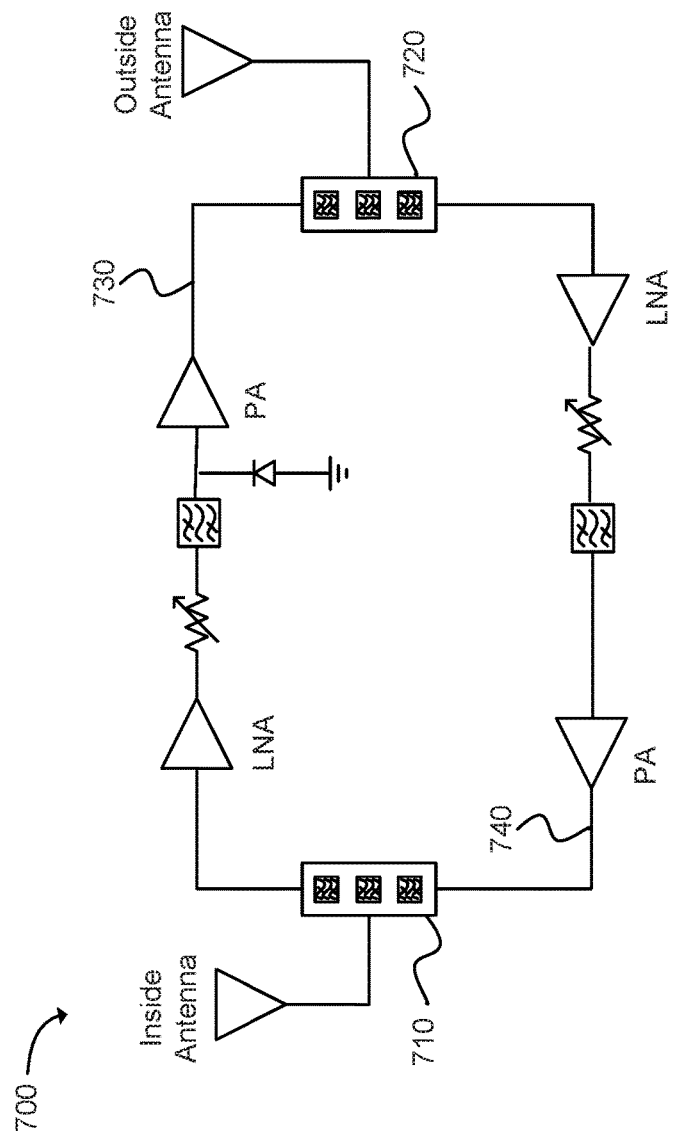
FIG. 7 illustrates a signal booster in accordance with an example.

FIG. 7 illustrates an exemplary signal booster 700. The signal booster 700 can include a first triplexer 710. The signal booster 700 can include a second triplexer 720. The signal booster 700 can include a first direction signal path 730 communicatively coupled between the first triplexer 710 and the second triplexer 720. The first direction signal path 730 can include one or more amplifiers and one or more band pass filters, and the first direction signal path 730 can be configured to amplify and filter first direction signals in one or more first direction bands, and the one or more first direction bands can be spectrally adjacent bands. The signal booster 700 can include a second direction signal path 740 communicatively coupled between the first triplexer 710 and the second triplexer 720. The second direction signal path 740 can include one or more amplifiers and one or more band pass filters configured to amplify and filter second direction signals in one or more second direction bands, and the one or more second direction bands can be spectrally adjacent bands.

Figure 8:
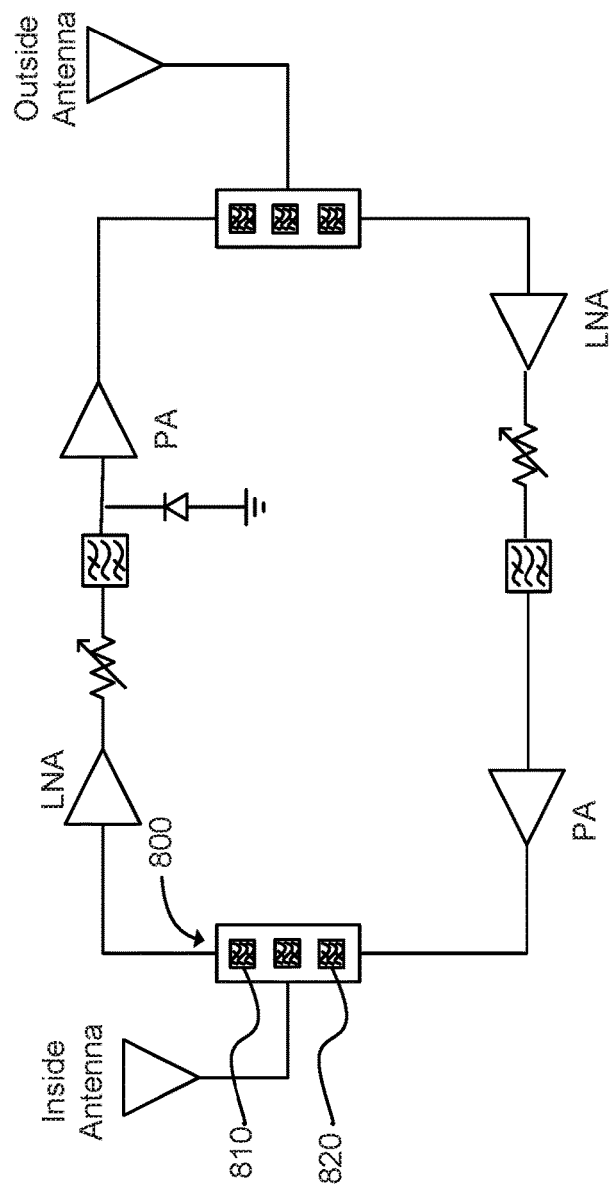
FIG. 8 illustrates a triplexer in accordance with an example.

FIG. 8 illustrates an exemplary triplexer 800 in a signal booster. The triplexer 800 can include one or more first direction filters 810 configured to filter first direction signals in one or more first direction bands, and the one or more first direction bands can be spectrally adjacent bands. The triplexer 800 can include one or more second direction filters 820 configured to filter second direction signals in one or more second direction bands, and the one or more second direction bands can be spectrally adjacent bands.

Figure 9:
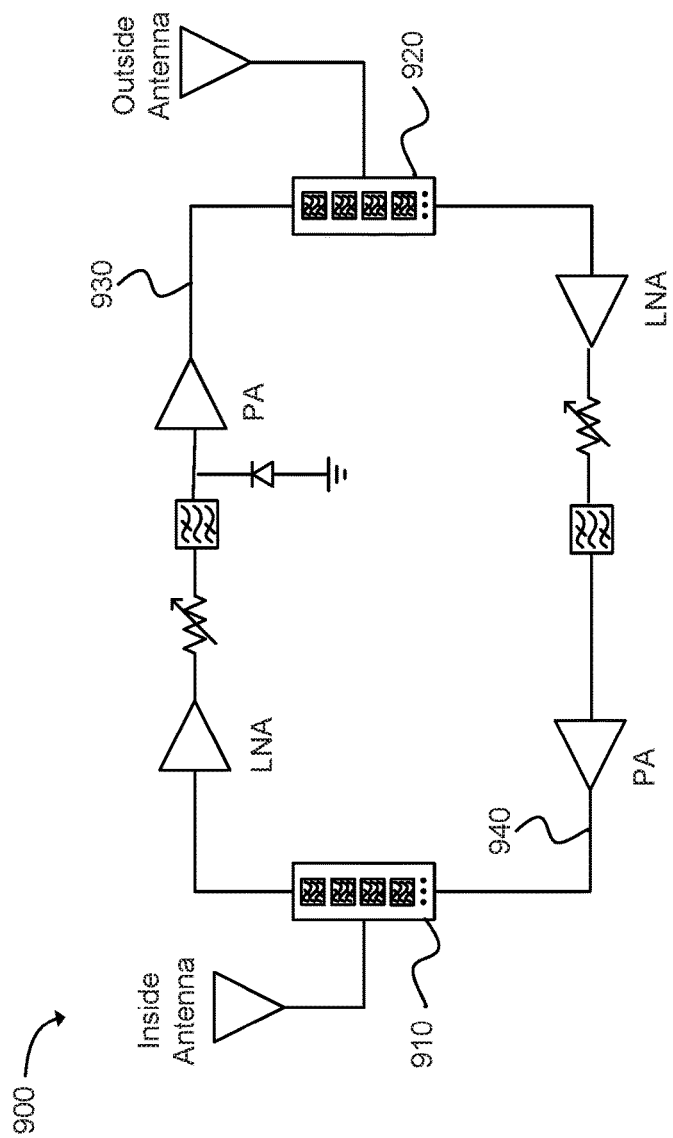
FIG. 9 illustrates a signal booster in accordance with an example.

FIG. 9 illustrates an exemplary signal booster 900. The signal booster 900 can include a first multiband filter 910 that includes a first first-direction port and a first second-direction port. The signal booster 900 can include a second multiband filter 920 that includes a second first-direction port and a second second-direction port. The first multiband filter 910 and the second multiband filter 920 can include four or more filters. The four or more filters can include first direction filters and/or second direction filters. Each signal path can be associated with a selected first direction filter or second direction filter of the four or more filters. The signal booster 900 can include one or more first direction signal paths 930 communicatively coupled between the first first-direction port in the first multiband filter 910 and the second first-direction port in the second multiband filter 920. The signal booster 900 can include one or more second direction signal paths 940 communicatively coupled between the first second-direction port in the first multiband filter 910 and the second second-direction port in the second multiband filter 920.

Figure 10:
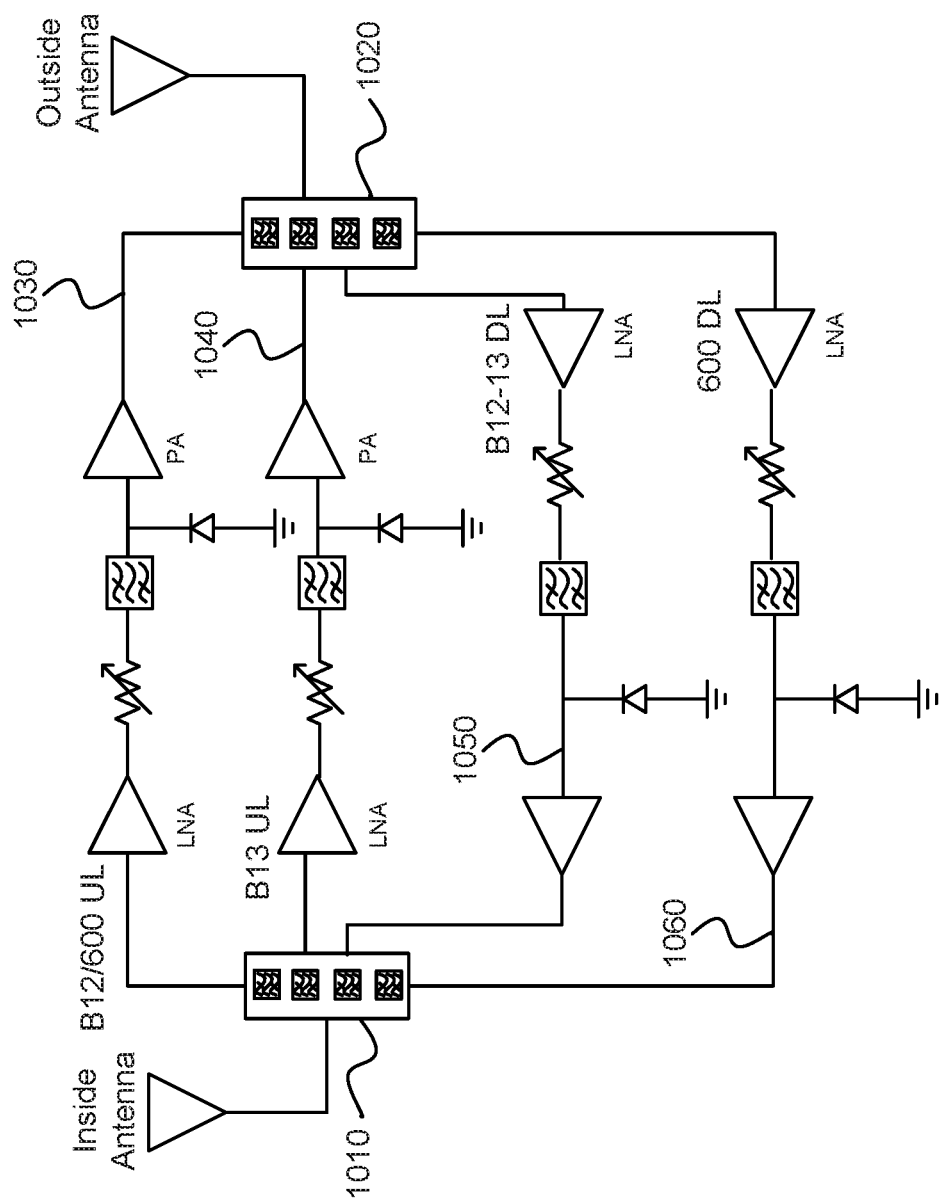
FIG. 10 illustrates a signal booster that includes uplink and/or downlink signal paths in spectrally adjacent bands in accordance with an example.

FIG. 10 illustrates an exemplary signal booster 1000 that includes uplink and/or downlink signal paths in spectrally adjacent bands. The signal booster 1000 can include a first multiband filter 1010 and a second multiband filter 1020. The first multiband filter 1010 can be communicatively coupled to an inside antenna and the second multiband filter 1020 can be communicatively coupled to an outside antenna. The signal booster 1000 can include a first uplink signal path 1030 and a second uplink signal path 1040 communicatively coupled between the first multiband filter 1010 and the second multiband filter 1020. The first uplink signal path 1030 and the second uplink signal path 1040 can each include one or more amplifiers and one or more band pass filters. Similarly, the signal booster 1000 can include a first downlink signal path 1050 and a second downlink signal path 1060 communicatively coupled between the first multiband filter 1010 and the second multiband filter 1020. The first downlink signal path 1050 and the second downlink signal path 1060 can each include one or more amplifiers and one or more band pass filters. Each signal path (downlink and uplink) can include a signal detector to detect control information associated with signals transmitted on the signal path. In addition, the signal booster 900 can employ down-converting, and then either an analog intermediate frequency (IF) filter or digital filter.

In this example, the first uplink signal path 1030 can be for band 12 (B12) and the 600 MHz uplink frequency range. In other words, the first uplink signal path 1030 can be a combined signal path for B12 and 600 MHz. In uplink, B12 corresponds to a frequency range of 699 megahertz (MHz) to 716 MHz, so B12 and the 600 MHz frequency range are spectrally adjacent. In this example, the second uplink signal path 1040 can be for B12. In uplink, B13 corresponds to a frequency range of 777 MHz to 787 MHz. In this example, the first downlink signal path 1050 can be for B12 and B13. In other words, the first downlink signal path 1050 can be a combined signal path for B12 and B13. In downlink, B12 corresponds to a frequency range of 729 MHz to 746 MHz and B13 corresponds to a frequency range of 746 MHz to 756 MHz, so B12 and B13 are spectrally adjacent to each other in the downlink. Alternatively, the first downlink signal path 1050 can be a combined signal path for B12, B13 and B14, which are all spectrally adjacent to each other in the downlink. In this example, the second downlink signal path 1060 can be for the 600 MHz downlink frequency range.

In an alternative configuration, first uplink signal path 1030 can be for B12 and the 600 MHz uplink frequency range, and the second uplink signal path 1040 can be for B13 and a band 14 (B14). In uplink, B14 corresponds to a frequency range of 788 MHz to 798 MHz. In addition, the first downlink signal path 1050 can be for B12, B13 and B14, and the second downlink signal path 1060 can be for the 600 MHz downlink frequency range. In downlink B14 corresponds to a frequency range of 758 MHz to 768 MHz.

Figure 11:
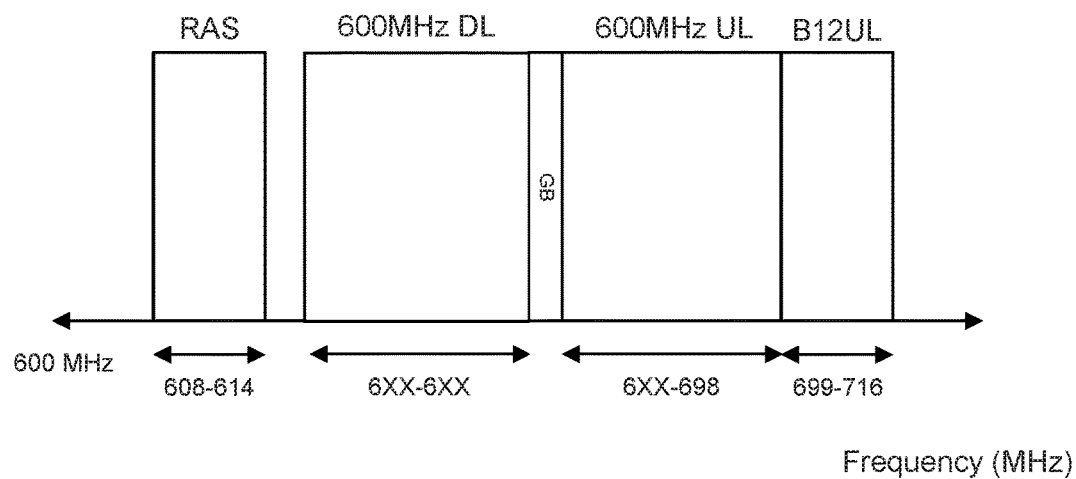
FIG. 11 illustrates frequency ranges for a 600 megahertz (MHz) band in accordance with an example.

FIG. 11 exemplary frequency ranges for a 600 megahertz (MHz) frequency band. As shown, a band 12 (B12) uplink (UL) band corresponds to a frequency range of 699 MHz to 716 MHz. A 600 MHz UL band can be spectrally adjacent to the B12 UL band. The 600 MHz UL band can range from a defined frequency range (e.g., 6XX MHz to 6XX MHz). A 600 MHz downlink (DL) band can have a lower frequency than the 600 MHz UL band, and the 600 MHz DL band and the 600 MHz UL band can be separated by a guard band (GB). The 600 MHz DL band can range from a defined frequency range (e.g., 6XX MHz to 6XX MHz). In addition, a radio astronomy service (RAS) can correspond to a frequency range of 608 MHz to 614 MHz. In one example, 84 MHz of the 600 MHz frequency band can be utilized for uplink and downlink traffic. Therefore, 7 paired blocks and the RAS may not be utilized for uplink and downlink traffic in the 600 MHz frequency band.

Figure 12:
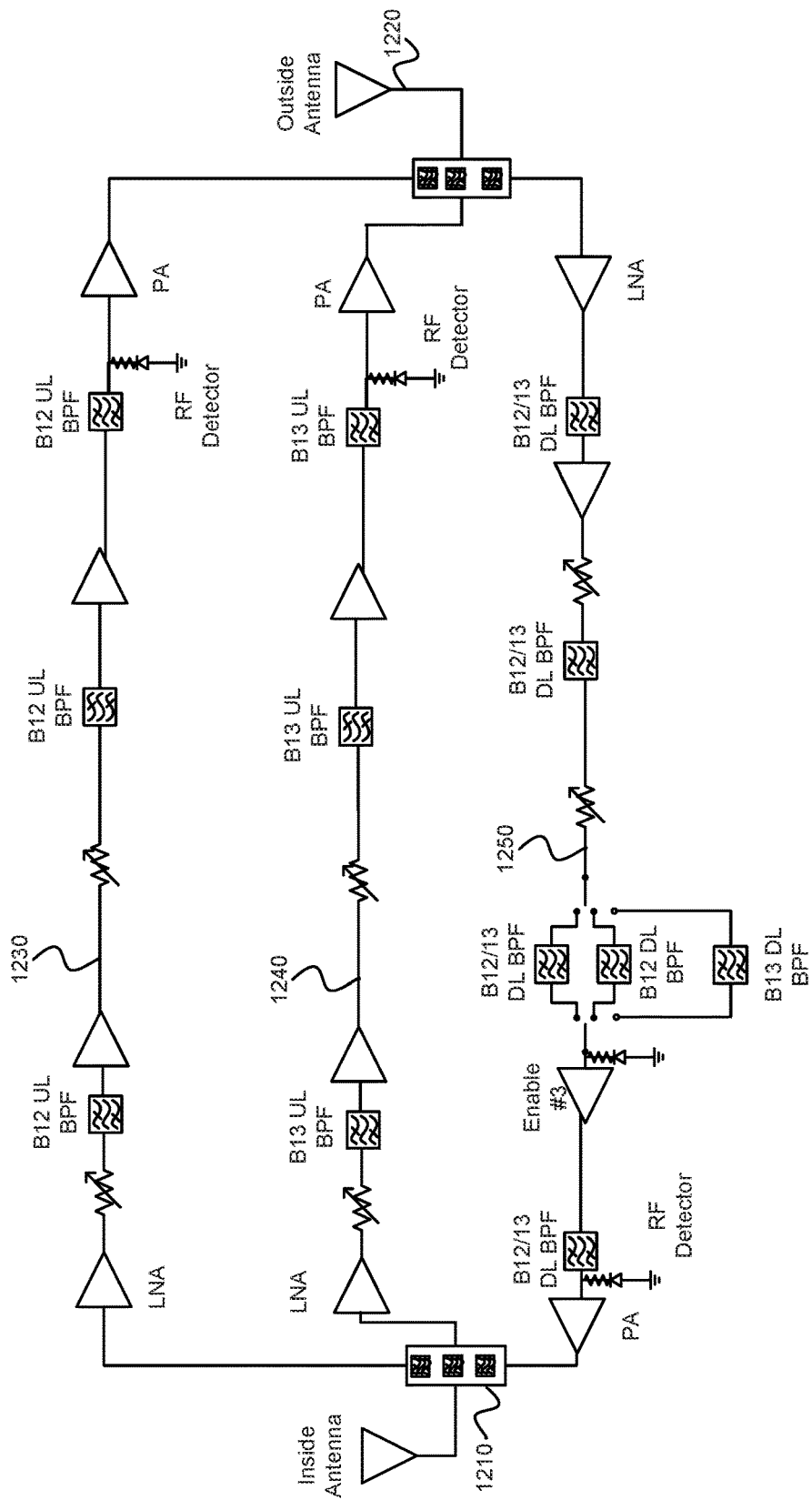
FIG. 12 illustrates a signal booster that includes uplink and/or downlink signal paths in spectrally adjacent bands in accordance with an example.

FIG. 12 illustrates an exemplary signal booster 1200 that includes uplink and/or downlink signal paths in spectrally adjacent bands. The signal booster 1200 can include a first multiband filter 1210 (e.g., a first triplexer) and a second multiband filter 1220 (e.g., a second triplexer). The first multiband filter 1210 can be communicatively coupled to an inside antenna and the second multiband filter 1220 can be communicatively coupled to an outside antenna. The signal booster 1200 can include a first uplink signal path 1230 and a second uplink signal path 1240 communicatively coupled between the first multiband filter 1210 and the second multiband filter 1220. The first uplink signal path 1230 and the second uplink signal path 1240 can each include one or more amplifiers and one or more band pass filters. In addition, the signal booster 1200 can include a combined downlink signal path 1250 communicatively coupled between the first multiband filter 1210 and the second multiband filter 1220. The combined downlink signal path 1250 can include one or more amplifiers and one or more band pass filters.

In this example, the first uplink signal path 1230 can be for B12 and the second uplink signal path 1240 can be for B13. In this example, the combined downlink signal path 1250 can be for B12 and B13.

In one example, the combined downlink signal path 1250 can include a switchable B12 downlink band pass filter, a switchable B13 downlink bandpass filter, a switchable B12/B13 downlink bandpass filter, and a signal detector. The signal detector can be communicatively coupled to the switchable B12 downlink band pass filter, the switchable B13 downlink band pass filter and the switchable B12/B13 downlink band pass filter. The B12, B13 and B12/B13 downlink bandpass filters can be switched in and out, such that downlink received signals for B12, B13 or B12/B13 can be provided to the signal detector. The signal detector can be a log detector (e.g., a diode), and the signal detector can detect the control information (e.g., RSSI) associated with the downlink received signals for B12, B13 or B12/B13. In other words, the switchable B12, B13 and B12/B13 downlink band pass filters can enable the signal detector to separately detect the control information for downlink received signals for B12, B13 and B12/B13.

In one example, the signal booster 1200 can operate in a wideband mode or a single-band mode (e.g., only one of B12 or B13). For example, to initiate a single-band mode, a selected uplink power amplifier (PA) can be turned off and a selected downlink bandpass filter (BPF) can be switched on. As a specific example, a B13 UL PA can be turned off and a B12 DL BPF can be switched on. For the wideband mode, a wideband BPF for downlink can be switched in and both UL Pas can be turned off.

Figure 13:
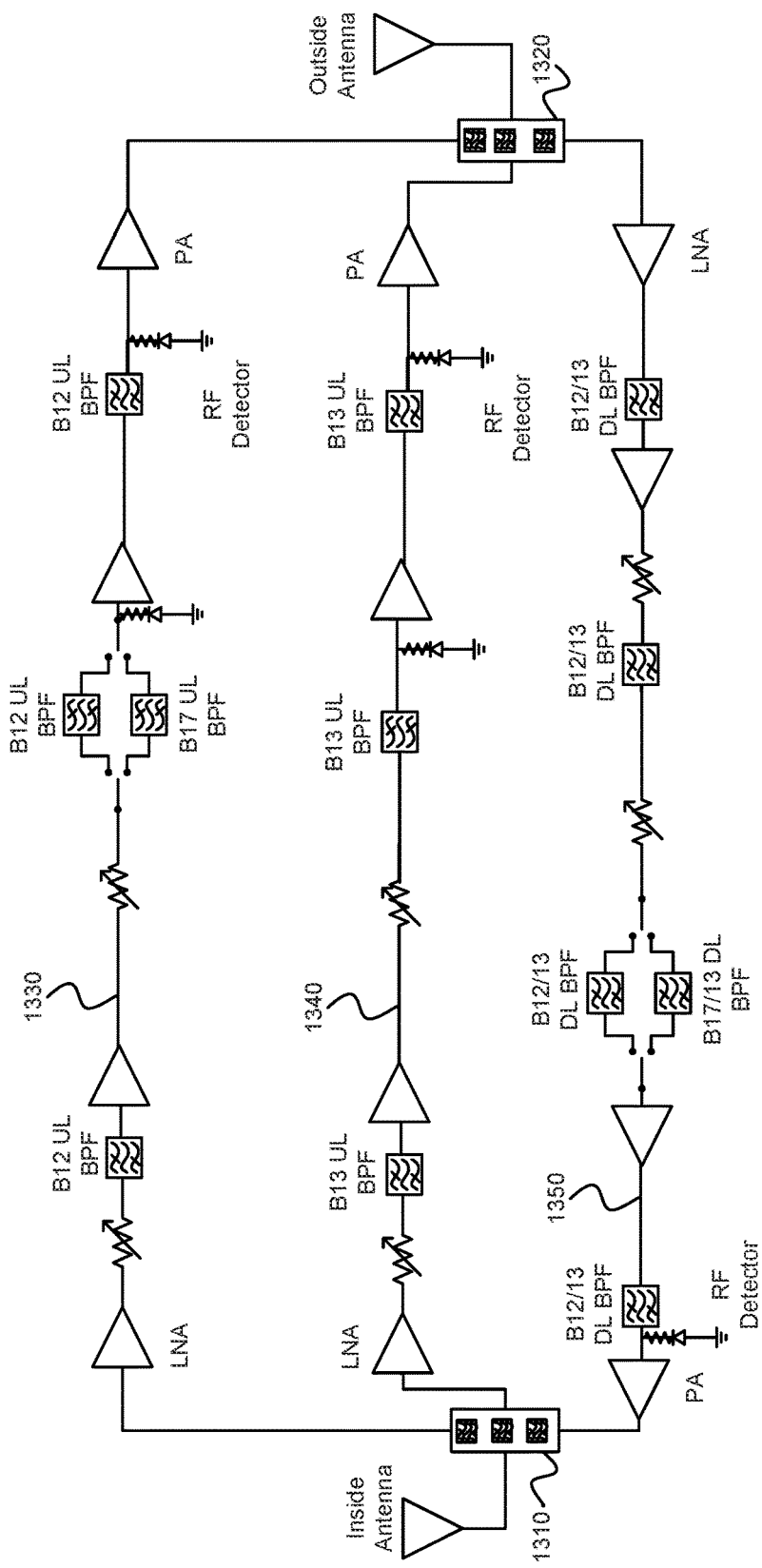
FIG. 13 illustrates a signal booster that includes uplink and/or downlink signal paths in spectrally adjacent bands in accordance with an example.

FIG. 13 illustrates an exemplary signal booster 1300 that includes uplink and/or downlink signal paths in spectrally adjacent bands. The signal booster 1300 can include a first multiband filter 1310 (e.g., a first triplexer) and a second multiband filter 1320 (e.g., a second triplexer). The first multiband filter 1310 can be communicatively coupled to an inside antenna and the second multiband filter 1320 can be communicatively coupled to an outside antenna. The signal booster 1300 can include a first uplink signal path 1330 and a second uplink signal path 1340 communicatively coupled between the first multiband filter 1310 and the second multiband filter 1320. The first uplink signal path 1330 and the second uplink signal path 1340 can each include one or more amplifiers and one or more band pass filters. In addition, the signal booster 1300 can include a combined downlink signal path 1350 communicatively coupled between the first multiband filter 1310 and the second multiband filter 1320. The combined downlink signal path 1350 can include one or more amplifiers and one or more band pass filters.

In this example, the first uplink signal path 1330 can be for B12 and B17 and the second uplink signal path 1340 can be for B13. In the uplink, B12 corresponds to a frequency range of 699 MHz to 716 MHz and B17 corresponds to a frequency range of 704 MHz to 716 MHz. In this example, the combined downlink signal path 1350 can be for B12 and B13 and B17. In downlink, B12 corresponds to a frequency range of 729 MHz to 746 MHz, B13 corresponds to a frequency range of 746 MHz to 756 MHz and B17 corresponds to a frequency range of 734 to 746 MHz. Therefore, the signal booster 1300 can operate in a B12/B13 mode or a B17/B13 mode.

In one example, the first uplink signal path 1330 can include a switchable B12 uplink band pass filter and a switchable B17 uplink bandpass filter. In another example, the combined downlink signal path 750 can include a switchable B12/B13 downlink band pass filter, a switchable B17/B13 downlink bandpass filter, and a signal detector. The signal detector can be communicatively coupled to the switchable B12/B13 downlink band pass filter and the switchable B17/B13 downlink band pass filter. The B12/B13 and B17/B13 downlink bandpass filters can be switched in and out, such that downlink received signals for B12/B13 or B17/B13 can be provided to the signal detector. The signal detector can be a log detector (e.g., a diode), and the signal detector can detect the control information (e.g., RSSI) associated with the downlink received signals for B12/B13 or B17/B13. In other words, the switchable B12/B13 and B17/B13 downlink band pass filters can enable the signal detector to separately detect the control information for downlink received signals for B12/B13 and B17/B13.

In one configuration, the first uplink signal path 1330 and the second uplink signal path 1340 can be controlled independently of the combined downlink signal path 1350, which can provide additional flexibility in network protections and mitigate near-far problems.

Figure 14:
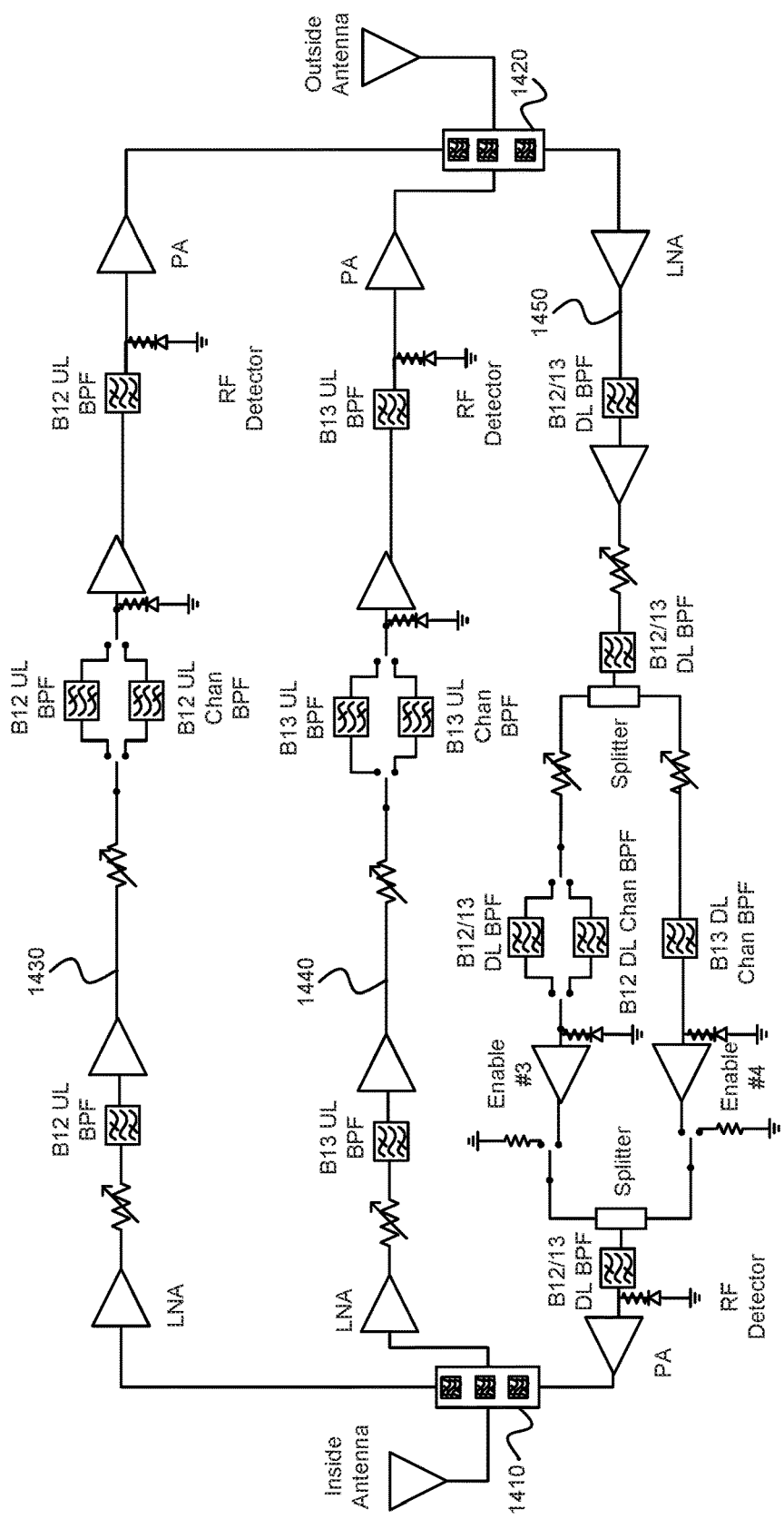
FIG. 14 illustrates a signal booster that is operable in a wideband mode or a channelized mode in accordance with an example.

FIG. 14 illustrates an exemplary signal booster that is operable in a wideband mode or a channelized mode. The signal booster 1400 can include a first multiband filter 1410 (e.g., a first triplexer) and a second multiband filter 1420 (e.g., a second triplexer). The first multiband filter 1410 can be communicatively coupled to an inside antenna and the second multiband filter 1420 can be communicatively coupled to an outside antenna. The signal booster 1400 can include a first uplink signal path 1430 and a second uplink signal path 1440 communicatively coupled between the first multiband filter 1410 and the second multiband filter 1420. The first uplink signal path 1430 and the second uplink signal path 1440 can each include one or more amplifiers and one or more band pass filters. In addition, the signal booster 1400 can include a combined downlink signal path 1450 communicatively coupled between the first multiband filter 1410 and the second multiband filter 1420. The combined downlink signal path 1450 can include one or more amplifiers and one or more band pass filters.

In this example, the first uplink signal path 1430 can be for B12 and the second uplink signal path 1440 can be for B13. In this example, the combined downlink signal path 1450 can be for B12 and B13.

In one example, the first uplink signal path 1430 can include a switchable B12 uplink band pass filter and a switchable B12 uplink channelized bandpass filter. The switchable B12 uplink band pass filter can be a wideband B12 uplink filter (i.e., a wideband filter that passes signals in the entire B12 uplink band), whereas the switchable B12 uplink channelized bandpass filter can be a channelized B12 uplink filter (i.e., a channelized filter that only passes signals in a portion of the B12 uplink band). Similarly, the second uplink signal path 1440 can include a switchable B13 uplink band pass filter and a switchable B13 uplink channelized bandpass filter.

In one example, the combined downlink signal path 1450 can include a switchable B12/B13 downlink band pass filter (i.e., a wideband filter that passes signals in the entire B12/B13 downlink band), a switchable B12 downlink channelized bandpass filter (a channelized filter that only passes signals in a portion of the B12 downlink band), and a B13 downlink channelized bandpass filter (a channelized filter that only passes signals in a portion of the B13 downlink band). The combined downlink signal path 1450 can include a splitter that provides signals to the switchable B12/B13 downlink band pass filter or the switchable B12 downlink channelized bandpass filter, or to the B13 downlink channelized bandpass filter. In addition, the combined downlink signal path 1450 can include signal detector(s) that detect control information (e.g., RSSI) associated with the downlink received signals for B12/B13, a channelized B12 or a channelized B13, respectively.

In one example, the signal booster 1400 can operate in a wideband mode or a parallel channelized mode, in which B12 UL and B13 UL can be adjusted separately. In the wideband mode, a wideband BPF for UL and DL can be switched in (i.e., the B12 UL BPF, the B13 UL BPF and the B12/13 DL BPF can be switched in), and in the DL, a B13 DL channelized BPF can be disabled. In the parallel channelized mode, a channelized BPF for UL and DL can be switched in (i.e., the B12 UL channelized BPF, the B13 UL channelized BPF, and the B12 DL channelized BPF can be switched in, and in the DL, the B13 DL channelized BPF can be enabled. In another example, B12 and B13 in the uplink can be wideband, and the B12 or B13 BPFs can be switched between each other in the downlink, which can result in the passed band being full but blocks the other band.

Figure 15:
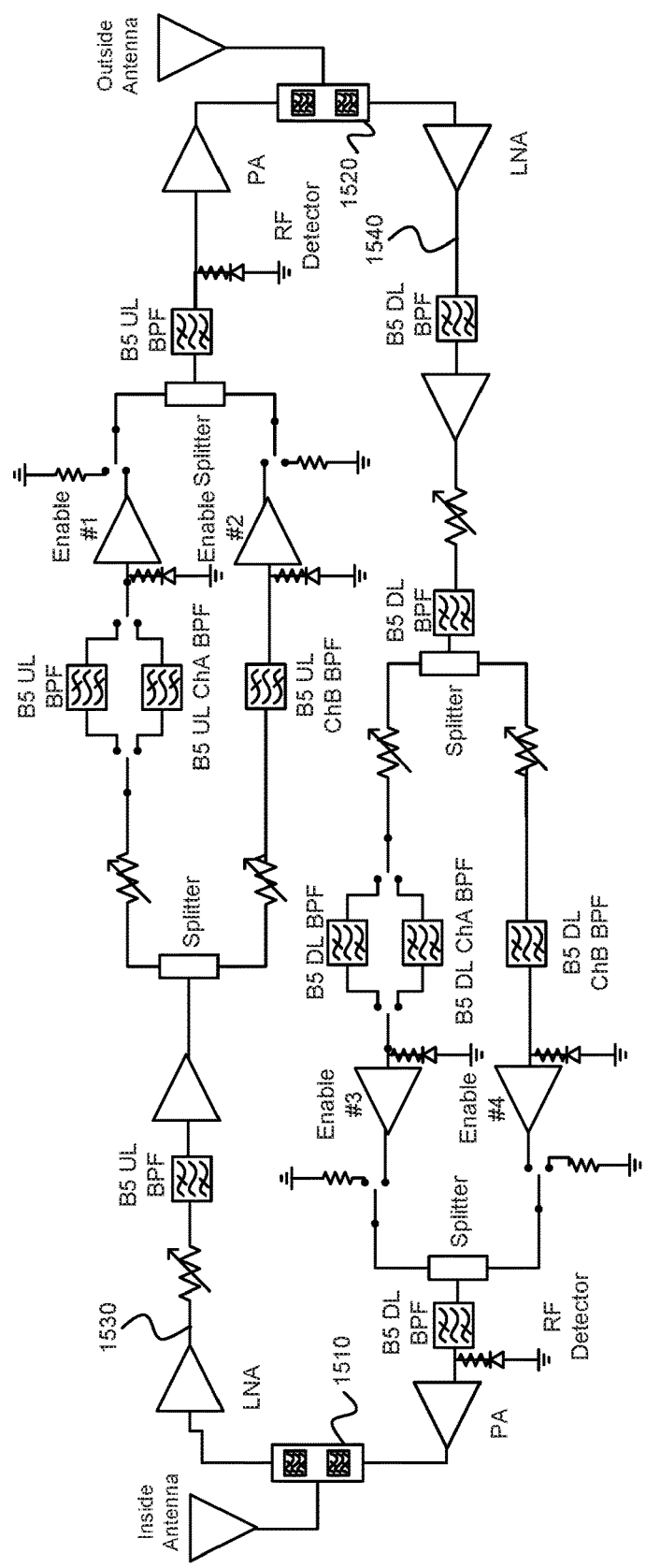
FIG. 15 illustrates a signal booster that is operable in a wideband mode or a channelized mode in accordance with an example.

FIG. 15 illustrates an exemplary signal booster that is operable in a wideband mode or a channelized mode. The signal booster 1500 can include a first multiband filter 1510 (e.g., a first duplexer) and a second multiband filter 1520 (e.g., a second duplexer). The first multiband filter 1510 can be communicatively coupled to an inside antenna and the second multiband filter 1520 can be communicatively coupled to an outside antenna. The signal booster 1500 can include an uplink signal path 1530 and a downlink signal path 1540 communicatively coupled between the first multiband filter 1510 and the second multiband filter 1520. The uplink signal path 1530 and the downlink signal path 1540 can each include one or more amplifiers and one or more band pass filters.

In this example, the uplink signal path 1530 can be for B5 and the downlink signal path 1540 can be for B5. In the uplink, B5 corresponds to a frequency range of 824 MHz to 849 MHz, and in the downlink, B5 corresponds to a frequency range of 869 MHz to 894 MHz.

In one example, the uplink signal path 1530 can include a switchable B5 uplink band pass filter (i.e., a wideband filter that passes signals in the entire B5 uplink band), a switchable B5 uplink channelized bandpass filter (a channelized filter that only passes signals in a first portion of the B5 uplink band, which corresponds to Channel A), and a B5 uplink channelized bandpass filter (a channelized filter that only passes signals in a first second of the B5 uplink band, which corresponds to Channel B). The uplink signal path 1530 can include a splitter that provides signals to the switchable B5 uplink band pass filter or the switchable B5 uplink channelized bandpass filter corresponding to Channel A, or to the B5 uplink channelized bandpass filter corresponding to Channel B.

In one example, the downlink signal path 1540 can include a switchable B5 downlink band pass filter (i.e., a wideband filter that passes signals in the entire B5 downlink band), a switchable B5 downlink channelized bandpass filter (a channelized filter that only passes signals in a first portion of the B5 downlink band, which corresponds to Channel A), and a B5 downlink channelized bandpass filter (a channelized filter that only passes signals in a first second of the B5 downlink band, which corresponds to Channel B). The downlink signal path 1540 can include a splitter that provides signals to the switchable B5 downlink band pass filter or the switchable B5 downlink channelized bandpass filter corresponding to Channel A, or to the B5 downlink channelized bandpass filter corresponding to Channel B. In addition, the downlink signal path 1540 can include signal detector(s) that detect control information (e.g., RSSI) associated with the downlink received signals for Channel A of B5 or Channel B of B5, respectively.

In one example, the signal booster 1500 can operate in a wideband mode (full B5) or a parallel channelized mode, in which Channel A of B5 and Channel B of B5 in the uplink can be adjusted separately. In the wideband mode, a wideband BPF for UL and DL can be switched in (i.e., the B5 UL BPF and the B5 DL BPF), and B5 Channel B BPFs for UL and DL can be disabled. In the parallel channelized mode, B5 Channel A BPFs for UL and DL can be switched in (i.e., the B5 UL Channel A BPF and the B5 DL Channel A BPF can be switched in), and the B5 Channel B BPFs for UL and DL can be enabled (i.e., the B5 UL Channel B BPF and the B5 DL Channel B BPF can be enabled). In another example, single pole double throw (SPDT) switches can be utilized to maintain impedance matching to splitter(s) in the uplink signal path 1530 and/or the downlink signal path 1540 when any of Enable #1-4 are disabled.

Figure 16:
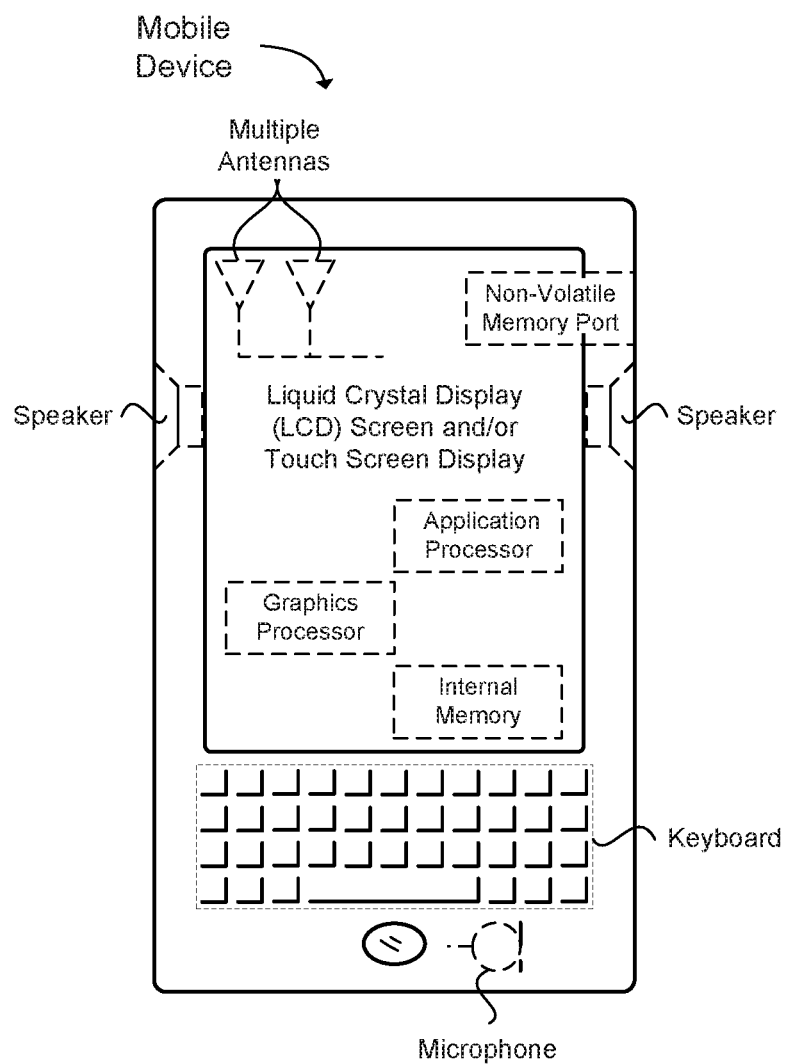
FIG. 16 illustrates a wireless device in accordance with an example.

FIG. 16 provides an example illustration of the wireless device, such as a user equipment (UE), a mobile station (MS), a mobile communication device, a tablet, a handset, a wireless transceiver coupled to a processor, or other type of wireless device. The wireless device can include one or more antennas configured to communicate with a node or transmission station, such as an access point (AP), a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 16 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be with the wireless device or wirelessly connected to the wireless device to provide additional user input. A virtual keyboard can also be provided using the touch screen.

EXAMPLES

The following examples pertain to specific technology embodiments and point out specific features, elements, or actions that can be used or otherwise combined in achieving such embodiments.

Example 1 includes a signal booster, comprising: a first triplexer; a second triplexer; a first uplink signal path communicatively coupled between the first triplexer and the second triplexer, the first uplink signal path including one or more amplifiers and one or more band pass filters, and the first signal path is configured to amplify and filter uplink signals in a first uplink band; a second uplink signal path communicatively coupled between the first triplexer and the second triplexer, the second uplink signal path including one or more amplifiers and one or more band pass filters, and the second signal path is configured to amplify and filter uplink signals in one or more of a second uplink band or a third uplink band that is spectrally adjacent to the second uplink band; and a downlink signal path communicatively coupled between the first triplexer and the second triplexer, the downlink signal path including one or more amplifiers and one or more band pass filters configured to amplify and filter downlink signals in one or more of a first downlink band, a second downlink band or a third downlink band, wherein the first downlink band, the second downlink band and the third downlink band are spectrally adjacent bands.

Example 2 includes the signal booster of Example 1, further comprising a controller operable to perform network protection by adjusting an uplink gain or a noise power for the first uplink band in the first uplink signal path, or for the second uplink band and the third uplink band in the second uplink signal path.

Example 3 includes the signal booster of any of Examples 1 to 2, wherein the uplink gain or noise power for the first uplink band is controlled independent of the uplink gain or noise power for the second uplink band and the third uplink band.

Example 4 includes the signal booster of any of Examples 1 to 3, wherein: the uplink gain or the noise power is adjusted for the first uplink band using control information associated with a received downlink signal in the first downlink band; or the uplink gain or the noise power is adjusted for the second uplink band and the third uplink band using control information associated with a received downlink signal in the second downlink band or the third downlink band.

Example 5 includes the signal booster of any of Examples 1 to 4, wherein the control information associated with the received downlink signal in the first downlink band, the second downlink band or the third downlink band includes a booster station coupling loss (BSCL) or a received signal strength indication (RSSI).

Example 6 includes the signal booster of any of Examples 1 to 5, wherein the downlink signal path further comprises a signal detector operable to detect the control information associated with the received downlink signal in one or more of the first downlink band, the second downlink band or the third downlink band.

Example 7 includes the signal booster of any of Examples 1 to 6, wherein the signal detector is communicatively coupled to a first switchable band pass filter, a second switchable band pass filter and a third switchable band pass filter, and a given switchable band pass filter is utilized for one or more of the first downlink band, the second downlink band or the third downlink band.

Example 8 includes the signal booster of any of Examples 1 to 7, further comprising a pass through signal path on the downlink signal path to the signal detector that bypasses the first switchable band pass filter, the second switchable band pass filter and the third switchable band pass filter, wherein the signal detector is configured to measure a signal power level for a combined downlink signal path.

Example 9 includes the signal booster of any of Examples 1 to 8, wherein the first uplink band is band 12 (B12), the second uplink band is band 13 (B13), and the third uplink band is band 14 (B14), wherein B12 corresponds to a frequency range of 699 megahertz (MHz) to 716 MHz in an uplink, B13 corresponds to a frequency range of 777 MHz to 787 MHz in the uplink, and B14 corresponds to a frequency range of 788 MHz to 798 MHz in the uplink.

Example 10 includes the signal booster of any of Examples 1 to 9, wherein the first downlink band is band 12 (B12), the second downlink band is band 13 (B13), and the third downlink band is band 14 (B14), wherein B12 corresponds to a frequency range of 729 megahertz (MHz) to 746 MHz in a downlink, B13 corresponds to a frequency range of 746 MHz to 756 MHz in the downlink, and B14 corresponds to a frequency range of 758 MHz to 768 MHz in the downlink.

Example 11 includes the signal booster of any of Examples 1 to 10, wherein the signal booster is a cellular signal booster configured to amplify cellular signals and retransmit amplified cellular signals.

Example 12 includes the signal booster of any of Examples 1 to 11, further comprising: an inside antenna communicatively coupled to the first triplexer; and an outside antenna communicatively coupled to the second triplexer.

Example 13 includes the signal booster of any of Examples 1 to 12, wherein the inside antenna is configured to: receive uplink signals from a mobile device; or transmit amplified and filtered downlink signals to the mobile device.

Example 14 includes the signal booster of any of Examples 1 to 13, wherein the outside antenna is configured to: receive downlink signals from a base station; or transmit amplified and filtered uplink signals to the base station.

Example 15 includes a signal booster, comprising: a first triplexer; a second triplexer; and a downlink signal path communicatively coupled between the first triplexer and the second triplexer, the downlink signal path including one or more amplifiers and one or more band pass filters configured to amplify and filter downlink signals in one or more of a first downlink band, a second downlink band or a third downlink band, wherein the first downlink band, the second downlink band and the third downlink band are spectrally adjacent bands.

Example 16 includes the signal booster of Example 15, further comprising: a first uplink signal path communicatively coupled between the first triplexer and the second triplexer, the first uplink signal path including one or more amplifiers and one or more band pass filters, and the first signal path is configured to amplify and filter uplink signals in a first uplink band; and a second uplink signal path communicatively coupled between the first triplexer and the second triplexer, the second uplink signal path including one or more amplifiers and one or more band pass filters, and the second signal path is configured to amplify and filter uplink signals in one or more of a second uplink band or a third uplink band that is spectrally adjacent to the second uplink band.

Example 17 includes the signal booster of any of Examples 15 to 16, further comprising a controller operable to perform network protection by adjusting an uplink gain or a noise power for the first uplink band in the first uplink signal path, or for the second uplink band and the third uplink band in the second uplink signal path.

Example 18 includes the signal booster of any of Examples 15 to 17, wherein: the uplink gain or the noise power is adjusted for the first uplink band using control information associated with a received downlink signal in the first downlink band; or the uplink gain or the noise power is adjusted for the second uplink band and the third uplink band using control information associated with a received downlink signal in the second downlink band or the third downlink band.

Example 19 includes the signal booster of any of Examples 15 to 18, wherein the downlink signal path further comprises a signal detector operable to detect the control information associated with the received downlink signal in one or more of the first downlink band, the second downlink band or the third downlink band.

Example 20 includes the signal booster of any of Examples 15 to 19, wherein the signal detector is communicatively coupled to a first switchable band pass filter, a second switchable band pass filter and a third switchable band pass filter, and a given switchable band pass filter is utilized for one or more of the first downlink band, the second downlink band or the third downlink band.

Example 21 includes the signal booster of any of Examples 15 to 20, further comprising a pass through signal path on the downlink signal path to the signal detector that bypasses the first switchable band pass filter, the second switchable band pass filter and the third switchable band pass filter, wherein the signal detector is configured to measure a signal power level for a combined downlink signal path.

Example 22 includes a cellular signal booster, comprising: a downlink cellular signal path configured to amplify and filter a downlink cellular signal received in a first downlink band, a second downlink band or a third downlink band, wherein the first downlink band, the second downlink band and the third downlink band are spectrally adjacent bands; and a controller operable to perform network protection by adjusting an uplink gain or noise power for a first uplink band in a first uplink cellular signal path, or for a second uplink band and a third uplink band in a second uplink cellular signal path, wherein the second uplink band is spectrally adjacent to the third uplink band, and the uplink gain or noise power is adjusted in the first uplink cellular path or the second uplink cellular path using control information associated with the downlink cellular signal received in one or more of the first downlink band, the second downlink band or the third downlink band.

Example 23 includes the cellular signal booster of Example 22, wherein the downlink cellular signal path further comprises a signal detector operable to detect the control information associated with the downlink cellular signal received in the first downlink band, the second downlink band or the third downlink band.

Example 24 includes the cellular signal booster of any of Examples 22 to 23, wherein the control information associated with the downlink cellular signal received in the first downlink band, the second downlink band or the third downlink band includes a booster station coupling loss (BSCL) or a received signal strength indication (RSSI).

Example 25 includes the cellular signal booster of any of Examples 22 to 24, wherein the downlink cellular signal path includes a pass through signal path to a signal detector on the downlink cellular signal path, wherein the pass through signal path bypasses a first switchable band pass filter communicatively coupled to the signal detector, a second switchable band pass filter communicatively coupled to the signal detector, and a third switchable band pass filter communicatively coupled to the signal detector, wherein the signal detector is configured to measure a signal power level for a combined downlink signal path.

Example 26 includes a signal booster, comprising: a first triplexer; a second triplexer; a first direction signal path communicatively coupled between the first triplexer and the second triplexer, the first direction signal path including one or more amplifiers and one or more band pass filters, and the first direction signal path is configured to amplify and filter first direction signals in one or more first direction bands, wherein the one or more first direction bands are spectrally adjacent bands; and a second direction signal path communicatively coupled between the first triplexer and the second triplexer, the second direction signal path including one or more amplifiers and one or more band pass filters configured to amplify and filter second direction signals in one or more second direction bands, wherein the one or more second direction bands are spectrally adjacent bands.

Example 27 includes the signal booster of Example 26, further comprising a controller operable to perform network protection by adjusting a gain or a noise power for the one or more first direction bands in the first direction signal path.

Example 28 includes the signal booster of any of Examples 26 to 27, wherein the gain or the noise power is adjusted for the one or more first direction bands in the first direction signal path based on control information associated with received second direction signals in one or more second direction bands.

Example 29 includes the signal booster of any of Examples 26 to 28, wherein the control information associated with the received second direction signals in one or more second direction bands includes a booster station coupling loss (BSCL) or a received signal strength indication (RSSI).

Example 30 includes the signal booster of any of Examples 26 to 29, wherein the second direction signal path further comprises a signal detector operable to detect the control information associated with the received second direction signals in one or more second direction bands.

Example 31 includes a triplexer in a signal booster, the triplexer comprising: one or more first direction filters configured to filter first direction signals in one or more first direction bands, wherein the one or more first direction bands are spectrally adjacent bands; and one or more second direction filters configured to filter second direction signals in one or more second direction bands, wherein the one or more second direction bands are spectrally adjacent bands, wherein one of the first direction filters or the second direction filters is configured to pass signals to a combined signal path for three spectrally adjacent bands.

Example 32 includes the triplexer of Example 31, further comprising: a common port communicatively coupled to an antenna; a first port communicatively coupled to a first direction signal path; and a second port communicatively coupled to a second direction signal path.

Example 33 includes the triplexer of any of Examples 31 to 32, wherein: the first direction signals include uplink signals or downlink signals; and the second direction signals include uplink signals or downlink signals.

Example 34 includes the triplexer of any of Examples 31 to 33, wherein the one or more first direction bands include at least one of band 12 (B12), band 13 (B13), or band 14 (B14), wherein B12 corresponds to a frequency range of 699 megahertz (MHz) to 716 MHz in a first direction, B13 corresponds to a frequency range of 777 MHz to 787 MHz in the first direction, and B14 corresponds to a frequency range of 788 MHz to 798 MHz in the first direction.

Example 35 includes the triplexer of any of Examples 31 to 34, wherein the one or more second direction bands include at least one of band 12 (B12), band 13 (B13), or band 14 (B14), wherein B12 corresponds to a frequency range of 729 megahertz (MHz) to 746 MHz in a second direction, B13 corresponds to a frequency range of 746 MHz to 756 MHz in the second direction, and B14 corresponds to a frequency range of 758 MHz to 768 MHz in the second direction.

Example 36 includes a signal booster, comprising: a first multiband filter that includes a first first-direction port and a first second-direction port; a second multiband filter that includes a second first-direction port and a second second-direction port; one or more first direction signal paths communicatively coupled between the first first-direction port in the first multiband filter and the second first-direction port in the second multiband filter; and one or more second direction signal paths communicatively coupled between the first second-direction port in the first multiband filter and the second second-direction port in the second multiband filter.

Example 37 includes the signal booster of Example 36, wherein the one or more first direction signal paths include one or more amplifiers and one or more band pass filters, and the one or more first direction signal paths are configured to amplify and filter first direction signals in one or more first direction bands, wherein the one or more first direction bands are spectrally adjacent bands.

Example 38 includes the signal booster of any of Examples 36 to 37, wherein the one or more second direction signal paths include one or more amplifiers and one or more band pass filters, and the one or more second direction signal paths are configured to amplify and filter second direction signals in one or more second direction bands, wherein the one or more second direction bands are spectrally adjacent bands.

Example 39 includes the signal booster of any of Examples 36 to 38, wherein: the one or more first direction signal paths include uplink signal paths or downlink signal paths; and the one or more second direction signal paths include uplink signal paths or downlink signal paths.

Example 40 includes the signal booster of any of Examples 36 to 39, wherein each of the one or more first direction signal paths are associated with a selected filter within the first multiband filter and a selected filter within the second multiband filter.

Example 41 includes the signal booster of any of Examples 36 to 40, wherein the first multiband filter and the second multiband filter each include four or more filters, wherein each filter is associated with the first direction signal path or the second direction signal path.

Example 42 includes the signal booster of any of Examples 36 to 41, wherein: the first first-direction port in the first multiband filter is a first uplink port; the first second-direction port in the first multiband filter is a first downlink port; the second first-direction port in the second multiband filter is a second uplink port; and the second second-direction port second multiband filter is a second downlink port.

Example 43 includes a repeater, comprising: a first multiband filter; a second multiband filter; one or more first-direction signal paths communicatively coupled between the first multiband filter and the second multi-band filter, wherein at least one of the one or more first-direction signal paths are configured to amplify and filter signals in two or more spectrally adjacent bands; and one or more second-direction signal paths communicatively coupled between the first multiband filter and the second multi-band filter, wherein at least one of the one or more second-direction signal paths are configured to amplify and filter signals in two or more spectrally adjacent bands.

Example 44 includes the repeater of Example 43, wherein the one or more first-direction signal paths includes: a first-direction band 12 (B12) and a first-direction 600 megahertz (MHz) band combined signal path; and a first-direction band 13 (B13) signal path.

Example 45 includes the repeater of any of Examples 43 to 44, wherein the one or more first-direction signal paths includes: a first-direction band 12 (B12) and a first-direction 600 megahertz (MHz) band combined signal path; and a first-direction band 13 (B13) and band 14 (B14) combined signal path.

Example 46 includes the repeater of any of Examples 43 to 45, wherein the one or more second-direction signal paths includes: a second-direction band 12 (B12) and band 13 (B13) and band 14 (B14) combined signal path; and a second-direction 600 megahertz (MHz) band signal path.

Example 47 includes the repeater of any of Examples 43 to 46, wherein the one or more second-direction signal paths includes: a second-direction band 12 (B12) and band 13 (B13) combined signal path; and a second-direction 600 megahertz (MHz) band signal path.

Example 48 includes the repeater of any of Examples 43 to 47, wherein B12 corresponds to a frequency range of 699 MHz to 716 MHz in the first-direction, B13 corresponds to a frequency range of 777 MHz to 787 MHz in the first-direction and B14 corresponds to a frequency range of 788 MHz to 798 MHz in the first-direction, wherein the first-direction is an uplink.

Example 49 includes the repeater of any of Examples 43 to 48, wherein B12 corresponds to a frequency range of 729 MHz to 746 MHz in the second-direction, B13corresponds to a frequency range of 746 MHz to 756 MHz in the second-direction and B14 corresponds to a frequency range of 758 MHz to 768 MHz in the second-direction, wherein the second-direction is a downlink.

Example 50 includes a repeater, comprising: a first multiband filter; a second multiband filter; one or more first-direction signal paths communicatively coupled between the first multiband filter and the second multi-band filter, wherein the one or more first-direction signal paths are configured to amplify and filter signals; and one or more second-direction signal paths communicatively coupled between the first multiband filter and the second multi-band filter, wherein at least one of the one or more second-direction signal paths are configured to amplify and filter two or more signals in one or more spectrally adjacent bands or one or more spectrally overlapping bands, wherein one or more of the first-direction signal paths or the second-direction signal paths include switchable bandpass filters or switchable channelized bandpass filters for one or more spectrally adjacent bands or one or more spectrally overlapping bands.

Example 51 includes the repeater of Example 50, wherein the one or more first-direction signal paths and the one or more second-direction signal paths are controlled separately by a controller in the repeater.

Example 52 includes the repeater of any of Examples 50 to 51, wherein the one or more first-direction signal paths includes: a first-direction band 12 (B12) signal path; and a first-direction band 13 (B13) signal path.

Example 53 includes the repeater of any of Examples 50 to 52, wherein the first-direction B12 signal path includes a first-direction B12 switchable bandpass filter and a first-direction B17 switchable bandpass filter, wherein B12 corresponds to a frequency range of 699 MHz to 716 MHz in the first-direction and B17 corresponds to a frequency range of 704 MHz to 716 MHz in the first-direction, wherein the first-direction is an uplink.

Example 54 includes the repeater of any of Examples 50 to 53, wherein the first-direction B13 signal path corresponds to a frequency range of 777 MHz to 787 MHz, wherein the first-direction is an uplink.

Example 55 includes the repeater of any of Examples 50 to 54, wherein the one or more second-direction signal paths includes a second-direction band 12 (B12) and band 13 (B13) combined signal path.

Example 56 includes the repeater of any of Examples 50 to 55, wherein the second-direction B12 and B13 combined signal path includes one or more of: a second-direction B12 switchable bandpass filter, a second-direction B13 switchable bandpass filter, a second-direction B12/B13 switchable bandpass filter or a second-direction B13/band 17 (B17) switchable bandpass filter.

Example 57 includes the repeater of any of Examples 50 to 56, wherein B12 corresponds to a frequency range of 729 megahertz (MHz) to 746 MHz in the second-direction, B13 corresponds to a frequency range of 746 MHz to 756 MHz in the second-direction and B17 corresponds to a frequency range of 734 MHz to 746 MHz in the second-direction, wherein the second-direction is a downlink.

Example 58 includes a repeater, comprising: a first multiband filter; a second multiband filter; one or more first-direction signal paths communicatively coupled between the first multiband filter and the second multi-band filter, wherein the one or more first-direction signal paths are configured to amplify and filter signals; and one or more second-direction signal paths communicatively coupled between the first multiband filter and the second multi-band filter, wherein the one or more second-direction signal paths are configured to amplify and filter signals, wherein one or more of the first-direction signal paths or the second-direction signal paths include one or more of: a switchable wideband bandpass filter, a switchable channelized bandpass filter or a channelized bandpass filter.

Example 59 includes the repeater of Example 58, wherein the one or more second-direction signal paths are configured to amplify and filter signals in one or more spectrally adjacent bands.

Example 60 includes the repeater of any of Examples 58 to 59, wherein the one or more first-direction signal paths includes one or more of: a first-direction band 5 (B5) signal path; a first-direction band 12 (B12) signal path; or a first-direction band 13 (B13) signal path.

Example 61 includes the repeater of any of Examples 58 to 60, wherein the first-direction B5 signal path includes a first-direction B5 switchable wideband bandpass filter, a first-direction B5 switchable channelized bandpass filter that corresponds to a first channel of the first-direction B5, and a first-direction B5 channelized bandpass filter that corresponds to a second channel of the first-direction B5, wherein B5 corresponds to a frequency range of 824 megahertz (MHz) to 849 MHz in the first-direction, wherein the first-direction is an uplink.

Example 62 includes the repeater of any of Examples 58 to 61, wherein the first-direction B5 signal path includes a first splitter and a first combiner communicatively coupled to: a first-direction B5 switchable wideband bandpass filter, a first-direction B5 switchable channelized bandpass filter that corresponds to a first channel of the first-direction B5, and a first-direction B5 channelized bandpass filter that corresponds to a second channel of the first-direction B5.

Example 63 includes the repeater of any of Examples 58 to 62, wherein: the first-direction B12 signal path includes a first-direction B12 switchable wideband bandpass filter and a first-direction B12 switchable channelized bandpass filter; and the first-direction B13 signal path includes a first-direction B13 switchable wideband bandpass filter and a first-direction B13 switchable channelized bandpass filter, wherein B12 corresponds to a frequency range of 699 megahertz (MHz) to 716 MHz in the first-direction and B13 corresponds to a frequency range of 777 MHz to 787 MHz in the first-direction, wherein the first-direction is an uplink Example 64 includes the repeater of any of Examples 58 to 63, wherein the one or more second-direction signal paths includes one or more of: a second-direction band 5 (B5) signal path; or a second-direction band 12 (B12) and band 13 (B13) combined signal path.

Example 65 includes the repeater of any of Examples 58 to 64, wherein the second-direction B5 signal path includes a second-direction B5 switchable wideband bandpass filter, a second-direction B5 switchable channelized bandpass filter that corresponds to a first channel of the second-direction B5, and a second-direction B5 channelized bandpass filter that corresponds to a second channel of the second-direction B5, wherein B5 corresponds to a frequency range of 869 megahertz (MHz) to 894 MHz in the second-direction, wherein the second-direction is a downlink.

Example 66 includes the repeater of any of Examples 58 to 65, wherein the second-direction B5 signal path includes a second splitter and a second combiner communicatively coupled to: a second-direction B5 switchable wideband bandpass filter, a second-direction B5 switchable channelized bandpass filter that corresponds to a first channel of the second-direction B5, and a second-direction B5 channelized bandpass filter that corresponds to a second channel of the second-direction B5.

Example 67 includes the repeater of any of Examples 58 to 66, wherein the second-direction B12 and B13 combined signal path includes a second-direction B12/B13 switchable wideband pass filter, a second-direction B12 switchable channelized bandpass filter and a second-direction B13 channelized bandpass filter, wherein B12 corresponds to a frequency range of 729 megahertz (MHz) to 746 MHz in the second-direction and B13 corresponds to a frequency range of 746 MHz to 756 MHz in the second-direction, wherein the second-direction is a downlink.

Example 68 includes the repeater of any of Examples 58 to 67, wherein the second-direction B12 and B13 combined signal path includes a second splitter and a second combiner communicatively coupled to: a second-direction B12/B13 switchable wideband pass filter, a second-direction B12 switchable channelized bandpass filter and a second-direction B13 channelized bandpass filter.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver or a baseband processor) can be used to communicate with other entities. The first hardware circuit and the second hardware circuit can be incorporated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A repeater, comprising:
    a first multiband filter;
    a second multiband filter;
    one or more first-direction signal paths communicatively coupled between the first multiband filter and the second multi-band filter, wherein at least one of the one or more first-direction signal paths are configured to amplify and filter signals in two or more spectrally adjacent bands, and wherein the one or more first-direction signal paths includes a first-direction band 12 (B12) and a first-direction 600 megahertz (MHz) band combined signal path or a first-direction band 13 (B13) and band 14 (B14) combined signal path; and
    one or more second-direction signal paths communicatively coupled between the first multiband filter and the second multi-band filter, wherein at least one of the one or more second-direction signal paths are configured to amplify and filter signals in two or more spectrally adjacent bands.

2. The repeater of claim 1, wherein the one or more first-direction signal paths includes:
    a first-direction band 13 (B13) signal path.

3. The repeater of claim 1, wherein the one or more first-direction signal paths includes:
    a first-direction band 13 (B13) and band 14 (B14) combined signal path.

4. The repeater of claim 3, wherein B12 corresponds to a frequency range of 699 MHz to 716 MHz in the first-direction, B13 corresponds to a frequency range of 777 MHz to 787 MHz in the first-direction and B14 corresponds to a frequency range of 788 MHz to 798 MHz in the first-direction, wherein the first-direction is an uplink.

5. The repeater of claim 1, wherein the one or more second-direction signal paths includes:
    a second-direction band 12 (B12) and band 13 (B13) and band 14 (B14) combined signal path; and
    a second-direction 600 megahertz (MHz) band signal path.

6. The repeater of claim 5, wherein B12 corresponds to a frequency range of 729 MHz to 746 MHz in the second-direction, B13 corresponds to a frequency range of 746 MHz to 756 MHz in the second-direction and B14 corresponds to a frequency range of 758 MHz to 768 MHz in the second-direction, wherein the second-direction is a downlink.

7. The repeater of claim 1, wherein the one or more second-direction signal paths includes:
   a second-direction band 12 (B12) and band 13 (B13) combined signal path; and
   a second-direction 600 megahertz (MHz) band signal path.

8. A repeater, comprising:
   a first multiband filter;
   a second multiband filter;
   one or more first-direction signal paths communicatively coupled between the first multiband filter and the second multi-band filter, wherein the one or more first-direction signal paths are configured to amplify and filter signals, and wherein the one or more first-direction signal paths includes a first-direction band 12 (B12) and a first-direction 600 megahertz (MHz) band combined signal path or a first-direction band 13 (B13) and band 14 (B14) combined signal path; and
   one or more second-direction signal paths communicatively coupled between the first multiband filter and the second multi-band filter, wherein at least one of the one or more second-direction signal paths are configured to amplify and filter two or more signals in one or more spectrally adjacent bands or one or more spectrally overlapping bands,
   wherein one or more of the first-direction signal paths or the second-direction signal paths include switchable bandpass filters or switchable channelized bandpass filters for one or more spectrally adjacent bands or one or more spectrally overlapping bands.

9. The repeater of claim 8, wherein the one or more first-direction signal paths and the one or more second-direction signal paths are controlled separately by a controller in the repeater.

10. The repeater of claim 8, wherein the one or more first-direction signal paths includes:
    a first-direction band 12 (B12) signal path; and
    a first-direction band 13 (B13) signal path.

11. The repeater of claim 10, wherein the first-direction B12 signal path includes a first-direction B12 switchable bandpass filter and a first-direction B17 switchable bandpass filter, wherein B12 corresponds to a frequency range of 699 MHz to 716 MHz in the first-direction and B17 corresponds to a frequency range of 704 MHz to 716 MHz in the first-direction, wherein the first-direction is an uplink.

12. The repeater of claim 10, wherein the first-direction B13 signal path corresponds to a frequency range of 777 MHz to 787 MHz, wherein the first-direction is an uplink.

13. The repeater of claim 8, wherein the one or more second-direction signal paths includes a second-direction band 12 (B12) and band 13 (B13) combined signal path.

14. The repeater of claim 13, wherein the second-direction B12 and B13 combined signal path includes one or more of: a second-direction B12 switchable bandpass filter, a second-direction B13 switchable bandpass filter, a second-direction B12/B13 switchable bandpass filter or a second-direction B13/band 17 (B17) switchable bandpass filter.

15. The repeater of claim 14, wherein B12 corresponds to a frequency range of 729 megahertz (MHz) to 746 MHz in the second-direction, B13 corresponds to a frequency range of 746 MHz to 756 MHz in the second-direction and B17 corresponds to a frequency range of 734 MHz to 746 MHz in the second-direction, wherein the second-direction is a downlink.

16. A repeater, comprising:
    a first multiband filter;
    a second multiband filter;
    one or more first-direction signal paths communicatively coupled between the first multiband filter and the second multi-band filter, wherein the one or more first-direction signal paths are configured to amplify and filter signals, and wherein the one or more first-direction signal paths include a first-direction band 5 (B5) signal path, a first-direction band 12 (B12) signal path, and a first-direction band 13 (B13) signal path; and
    one or more second-direction signal paths communicatively coupled between the first multiband filter and the second multi-band filter, wherein the one or more second-direction signal paths are configured to amplify and filter signals,
    wherein one or more of the first-direction signal paths or the second-direction signal paths include one or more of: a switchable wideband bandpass filter, a switchable channelized bandpass filter or a channelized bandpass filter, and
    wherein the first-direction B5 signal path includes a first splitter and a first combiner communicatively coupled to: a first-direction B5 switchable wideband bandpass filter, a first-direction B5 switchable channelized bandpass filter that corresponds to a first channel of the first-direction B5, and a first-direction B5 channelized bandpass filter that corresponds to a second channel of the first-direction B5.

17. The repeater of claim 16, wherein the one or more second-direction signal paths are configured to amplify and filter signals in one or more spectrally adjacent bands.

18. The repeater of claim 16, wherein the first-direction B5 signal path includes a first-direction B5 switchable wideband bandpass filter, a first-direction B5 switchable channelized bandpass filter that corresponds to a first channel of the first-direction B5, and a first-direction B5 channelized bandpass filter that corresponds to a second channel of the first-direction B5, wherein B5 corresponds to a frequency range of 824 megahertz (MHz) to 849 MHz in the first-direction, wherein the first-direction is an uplink.

19. The repeater of claim 16, wherein the one or more second-direction signal paths includes one or more of:
    a second-direction band 5 (B5) signal path; and
    a second-direction band 12 (B12) and band 13 (B13) combined signal path.

20. The repeater of claim 19, wherein the second-direction B5 signal path includes a second-direction B5 switchable wideband bandpass filter, a second-direction B5 switchable channelized bandpass filter that corresponds to a first channel of the second-direction B5, and a second-direction B5 channelized bandpass filter that corresponds to a second channel of the second-direction B5, wherein B5 corresponds to a frequency range of 869 megahertz (MHz) to 894 MHz in the second-direction, wherein the second-direction is a downlink.

21. The repeater of claim 19, wherein the second-direction B5 signal path includes a second splitter and a second combiner communicatively coupled to: a second-direction B5 switchable wideband bandpass filter, a second-direction B5 switchable channelized bandpass filter that corresponds to a first channel of the second-direction B5, and a second-direction B5 channelized bandpass filter that corresponds to a second channel of the second-direction B5.

22. The repeater of claim 19, wherein the second-direction B12 and B13 combined signal path includes a second-direction B12/B13 switchable wideband pass filter, a second-direction B12 switchable channelized bandpass filter and a second-direction B13 channelized bandpass filter, wherein B12 corresponds to a frequency range of 729 megahertz (MHz) to 746 MHz in the second-direction and B13 corresponds to a frequency range of 746 MHz to 756 MHz in the second-direction, wherein the second-direction is a downlink.

23. The repeater of claim 19, wherein the second-direction B12 and B13 combined signal path includes a second splitter and a second combiner communicatively coupled to: a second-direction B12/B13 switchable wideband pass filter, a second-direction B12 switchable channelized bandpass filter and a second-direction B13 channelized bandpass filter.

24. A repeater, comprising:
   a first multiband filter;
   a second multiband filter;
   one or more first-direction signal paths communicatively coupled between the first multiband filter and the second multi-band filter, wherein the one or more first-direction signal paths are configured to amplify and filter signals, and wherein the one or more first-direction signal paths include a first-direction band 5 (B5) signal path, a first-direction band 12 (B12) signal path, and a first-direction band 13 (B13) signal path; and
   one or more second-direction signal paths communicatively coupled between the first multiband filter and the second multi-band filter, wherein the one or more second-direction signal paths are configured to amplify and filter signals,
   wherein one or more of the first-direction signal paths or the second-direction signal paths include one or more of: a switchable wideband bandpass filter, a switchable channelized bandpass filter or a channelized bandpass filter;
   the first-direction B12 signal path includes a first-direction B12 switchable wideband bandpass filter and a first-direction B12 switchable channelized bandpass filter; and
   the first-direction B13 signal path includes a first-direction B13 switchable wideband bandpass filter and a first-direction B13 switchable channelized bandpass filter,
   wherein B12 corresponds to a frequency range of 699 megahertz (MHz) to 716 MHz in the first-direction and B13 corresponds to a frequency range of 777 MHz to 787 MHz in the first-direction, wherein the first-direction is an uplink.

* * * * *